United States Patent
Ocampo

(10) Patent No.: US 9,244,221 B1
(45) Date of Patent: Jan. 26, 2016

(54) LOW MODULUS PRIMARY COATINGS FOR OPTICAL FIBERS

(71) Applicant: Corning Incorporated, Corning, NY (US)

(72) Inventor: Manuela Ocampo, Corning, NY (US)

(73) Assignee: Corning Incorporated, Corning, NY (US)

(*) Notice: Subject to any disclaimer, the term of this patent is extended or adjusted under 35 U.S.C. 154(b) by 169 days.

(21) Appl. No.: 14/101,643

(22) Filed: Dec. 10, 2013

(51) Int. Cl.
| | |
|---|---|
| G02B 6/02 | (2006.01) |
| G02B 6/44 | (2006.01) |
| C03C 25/10 | (2006.01) |
| C08F 2/50 | (2006.01) |
| C08G 18/67 | (2006.01) |

(52) U.S. Cl.
CPC ............ *G02B 6/02395* (2013.01); *G02B 6/443* (2013.01); *C03C 25/1065* (2013.01); *C08F 2/50* (2013.01); *C08G 18/672* (2013.01); *G02B 6/02019* (2013.01); *G02B 6/02028* (2013.01)

(58) Field of Classification Search
CPC .. G02B 6/02; G02B 6/02028; G02B 6/02019; G02B 6/443; G02B 6/4402; C03C 25/1065; C03C 25/106; C08F 2/50; C08G 18/672
USPC ...................................... 385/128; 522/64, 96
See application file for complete search history.

(56) References Cited

U.S. PATENT DOCUMENTS

| | | | |
|---|---|---|---|
| 4,474,830 | A | 10/1984 | Taylor |
| 4,585,165 | A | 4/1986 | Iversen |
| 4,609,718 | A | 9/1986 | Bishop et al. |
| 4,629,287 | A | 12/1986 | Bishop |
| 4,798,852 | A | 1/1989 | Zimmerman et al. |
| 6,316,516 | B1 | 11/2001 | Chien et al. |
| 6,326,416 | B1 | 12/2001 | Chien et al. |
| 6,539,152 | B1 | 3/2003 | Fewkes et al. |
| 6,563,996 | B1 | 5/2003 | Winningham |
| 6,862,392 | B2 | 3/2005 | Fabian et al. |
| 7,010,205 | B2 | 3/2006 | Fabian et al. |
| 7,221,842 | B2 | 5/2007 | Baker et al. |
| 7,715,675 | B2 | 5/2010 | Fabian et al. |
| 2003/0077059 | A1 | 4/2003 | Chien et al. |
| 2003/0123839 | A1 | 7/2003 | Chou et al. |

OTHER PUBLICATIONS

Gasper, et al, "Integrated Approach to Studying the Development and Final Network Properties of Urethane Acrylate Coatings," Macromolecules, 39:2126-2136 (2006).
Ferry, J.D., Viscoelastic Properties of Polymers, 3$^{rd}$ ed., Wiley: New York (1980) Chapter 1—Book.

*Primary Examiner* — Akm Enayet Ullah
(74) *Attorney, Agent, or Firm* — Kevin L. Bray

(57) ABSTRACT

A coated optical fiber includes an optical fiber; and a primary coating encapsulating the optical fiber, the primary coating having an in-situ modulus of about 0.12 MPa or less at a thickness of about 32.5 μm, a Young's modulus as a cured film of about 0.7 MPa or less, and a $T_g$ of about −22° C. or below, wherein the primary coating is the cured reaction product of a primary curable composition having a gel-time ratio relative to C1 of less than about 2.

12 Claims, 12 Drawing Sheets

LOW MODULUS PRIMARY COATINGS FOR OPTICAL FIBERS

FIELD

The present disclosure relates generally to optical fiber, and more particularly to coating systems for optical fiber and coated optical fibers.

TECHNICAL BACKGROUND

Optical fibers typically have a glass core and cladding and two coatings. The coating's function is two-fold: to protect the optical fiber from mechanical damage and to preserve the ability of the optical fiber to transport light. The primary coating is applied directly to the glass core and cladding, it is typically a low modulus soft, cushioning material. The secondary coating is applied over the primary coating and is typically a high modulus material that functions as a tough protective layer that protects the fiber from environmental exposure and mechanical damage.

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers.

As the demand for optical fibers has increased, so has the desire to improve the processes used to make them. One common trend in the optical fiber industry has been the desire to draw optical fibers at increased speeds, thereby increasing the throughput of optical fiber manufacturing plants. However, the draw speed can be rate-limited by the step of curing the conventional polymeric coatings used to protect the fiber. One sign that a coating is applied to an optical fiber at a rate exceeding the coating's maximum draw speed is the presence of defects in the cured coating. There remains a need for optical fiber coatings that can be fully cured at higher draw speeds using standard optical fiber coating curing processes.

SUMMARY

One embodiment of the present disclosure relates to a coated optical fiber including an optical fiber; and a primary coating encapsulating the optical fiber, the primary coating having an in-situ modulus of about 0.12 MPa or less at a thickness of about 32.5 µm, a Young's modulus of a cured film of about 0.7 MPa or less, and a $T_g$ of about −22° C. and above −40° C., wherein the primary coating is the cured reaction product of a primary curable composition having a gel-time ratio relative to C1 of less than about 2 and more than about 1.1. Preferably, the primary coating is the cured reaction product of a primary curable composition having a gel-time of less than about 1.1 seconds at a UV intensity of about 1.9 mW/cm². Preferably, the primary coating comprises an outer diameter between 170 and 200 microns, and a secondary coating encapsulating said primary coating, the secondary coating comprising an outer diameter between 240 and 250 microns, and wherein the primary and secondary coatings together are capable of exhibiting an outer coating diameter variability such that at least 80%, more preferably at least 90%, and most preferably greater than 95% of the fiber manufacturing distribution is less than 10 µm for fibers manufactured at lamp/speed ratios equal to or less than 0.3.

Another embodiment of the present disclosure relates to an optical fiber inner primary coating composition including an in-situ modulus of about 0.12 MPa or less at a thickness of about 32.5 µm, a Young's modulus of a cured film of about 0.7 MPa or less, and a $T_g$ of about −22° C. or below (and preferably above −40 C), wherein the primary coating is the cured reaction product of a primary curable composition having a gel-time ratio relative to C1 of less than about 2 (and preferably more than about 1.1). Preferably, the primary coating is the cured reaction product of a primary curable composition having a gel-time of less than about 1.1 seconds at a UV intensity of about 1.9 mW/cm². Preferably, the primary coating comprises an outer diameter between 170 and 200 microns, and a secondary coating encapsulating said primary coating, the secondary coating comprising an outer diameter between 240 and 250 microns, and wherein the primary and secondary coatings together are capable of exhibiting an outer coating diameter variability such that at least 80%, more preferably at least 90%, and most preferably greater than 95% of the fiber manufacturing distribution is less than 10 µm for fibers manufactured at lamp/speed ratios equal to or less than 0.3.

Another embodiment of the present disclosure relates to a method for coating an optical fiber including the steps of providing a bare optical fiber; coating the optical fiber with a primary curable composition having a gel-time ratio relative to C1 of less than about 2, such as, for example those described above and herein below. Preferably, the gel time of the composition is less than about 1.1 seconds at a UV intensity of 1.9 mW/cm²; and curing the primary curable composition to form a primary coating encapsulating the optical fiber, the primary coating having an in-situ modulus of about 0.12 MPa or less at a thickness of about 32.5 µm and a Young's modulus of a cured film of about 0.7 MPa or less.

DETAILED DESCRIPTION

Figure 8:
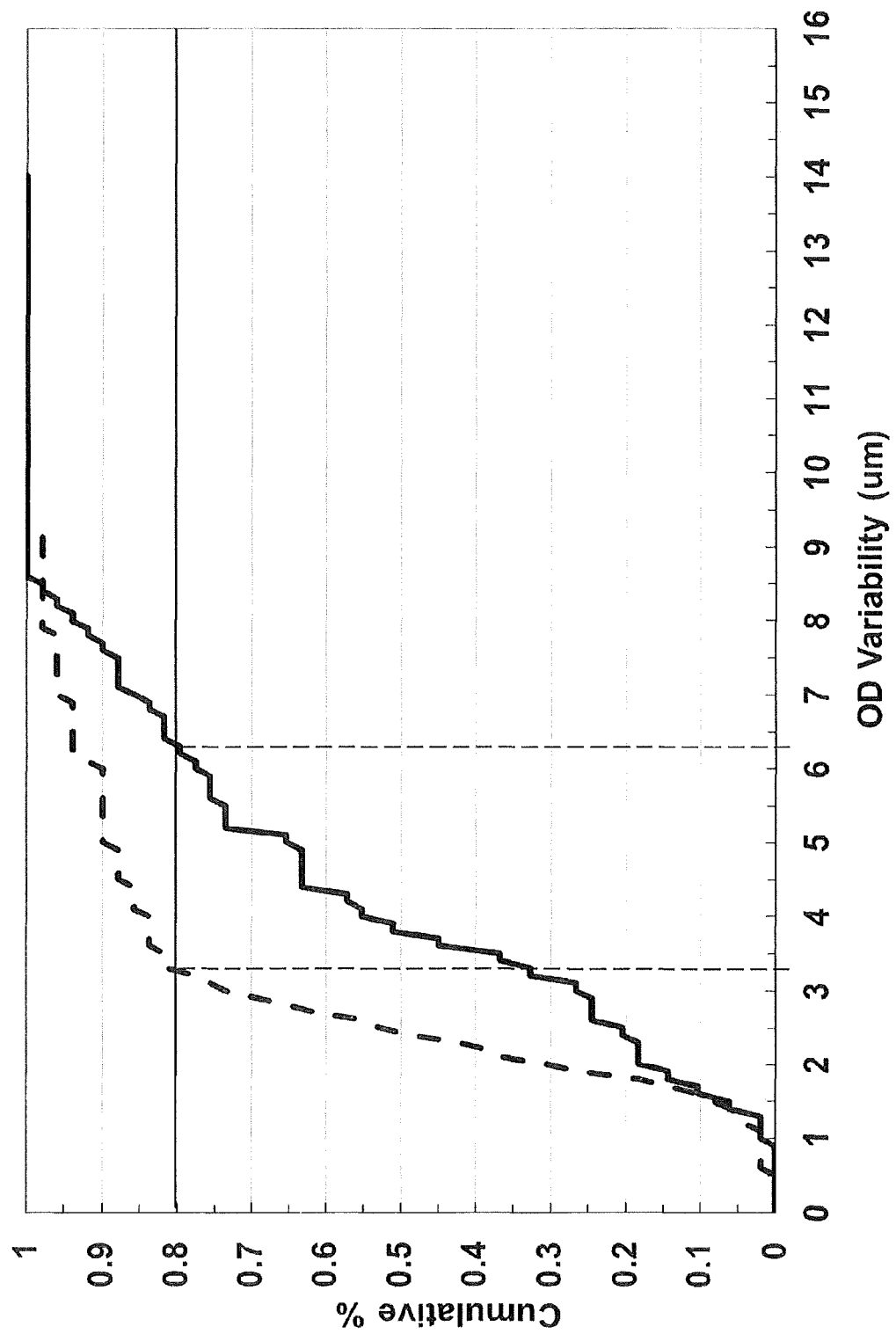
FIG. 8 shows outside coating diameter variability for a primary coating in accordance with one embodiment.

Disclosed herein are optical fiber primary coatings that exhibit low modulus, low $T_g$ and a viscosity and cure speed such that they can be processed at high speeds to produce defect-free coated optical fibers with high microbend resistance. The primary coatings have low Young's modulus leading to improved microbend performance. They can be manufactured at high draw speeds, have high cure speed, and have low gel time, and may also result in low cost primary coatings. A low Young's modulus is defined as less than about 0.7 MPa. A low in-situ modulus is defined as less than about 0.12 MPa. A low $T_g$ is defined as less than about −22° C. High cure speeds translate into the ability of the coating to cure at a certain dose. The UV radiation dose provided to the optical fiber is controlled by the speed of the fiber manufacturing process, the number of UV radiation curing lamps used and the intensity of those UV lamps. The lamp/speed ratio is an indication of the UV radiation dose provided to the optical fiber. Lamp/speed ratio as used herein is defined as the ratio of the number of I250 UV radiation curing lamps to the draw speed of the optical fiber in meters/second. For example, a draw tower that operates at 15 m/s draw speed with 3 lamps for the primary coating and 3 lamps for the secondary coating (3×3) will be said to operate at a 0.40 lamp to speed ratio. The radiation curable lamps employed herein are I250 lamp systems w/ D-bulb, P160 power supply, and F10T door reflector manufactured by Fusion UV Systems, Inc., Maryland, USA. Likewise, lamp/speed ratio as used herein is calculated using I250 lamp systems w/ D-bulb, P160 power supply, and F10T door reflector manufactured by Fusion UV Systems, Inc., Maryland, USA. The UV radiation from these lamps is focused upon the optical fiber as it passes the lamps. The primary coating compositions disclosed herein, when employed at a thickness between 170 and 200 microns along with secondary coatings disclosed herein at a diameter between 240 and 250 microns, are advantageously capable of improved fiber diameter variability, i.e. achieving less than 10 micron outside coating diameter variability for both the primary and secondary coatings for more than 80%, more preferably greater than 90, and most preferably greater than 95% of the manufacturing distribution of optical fiber coated using these coatings, even at relatively low lamp to speed ratios, i.e., lower than about 0.35, more preferably lower than about 0.30, and most preferably lower than about 0.20. Still more advantageous is the fact that the coatings described herein can achieve such low coating diameter variability at low lamp speed ratios while still maintaining low in-situ modulus of about 0.12 MPa or less at a thickness of about 32.5 μm. As a result, these low modulus coatings can be applied to the optical fiber at higher draw speeds. Manufacturing distribution as used herein means a distribution based on at least 25, and more preferably greater than 500 optical fiber shipping spools which have been drawn and wound onto the storage spools in sequence. For example, one could measure both ends on shipping spools (shipping fiber storage spools typically contain less than 75 km of optical fiber stored thereon). The coating diameter variability can be measured by measuring five different radial diameter measurements at both ends of fiber, and for the data taken at each end, determining the difference between the largest and smallest diameter values. Using the coatings described herein, diameter variabilities of less than 10 microns difference between each fiber cross sectional measurement can be achieved for more than 80%, more preferably at least 90%, and most preferably greater than 95% of the manufacturing distribution of optical fiber coated using these coatings, even at relatively low lamp to speed ratios. For example FIG. 8 shows a manufacturing distribution of primary coating variability (cumulative percent of data vs. maximum diameter variability per data point) for a primary coating as described herein (dotted line) and secondary coating coated over the cured primary coating. To achieve the data represented in FIG. 8, 25 shipping reels of optical fiber were tested by taking 5 diameter measurements at two locations (i.e, at opposing distal ends of the fiber) along the length of the fiber, and taking the maximum difference between each measurement in each set of 5 diameter measurements. Each of the reels of fiber were made using a lamp to speed ratios less than 0.30. As seen in FIG. 8, 100% of the reels tested exhibited less than 10 micron diameter variability.

In addition, the primary coatings described herein are capable of exhibiting a Mooney stress, when measured in an uniaxial tensile test and represented in a relative Mooney plot, which is equal to or less then 1.18, more preferably less than or equal to 1.175, and most preferably less than or equal to 1.075 at the strain value 1/λ of 0.45.

A relative Mooney plot can be obtained as follows: The primary measurement is the force-displacement curve, measured according to ISO 37 with a speed of 2.5 cm/min. From this measurement the engineering stress can be calculated according to formula (1):

$$\sigma_E = \frac{F}{A} \tag{1}$$

where F is the force and A is the initial cross-section of the sample. The strain λ is calculated by formula (2):

$$\lambda = \frac{l}{l_0} \tag{2}$$

where $l_0$ is the initial length and l the actual length of the prismatic region of the sample under test.

The Mooney stress, $\sigma_M$, can now be calculated from this engineering stress using ("Elastomers and Rubber Elasticity", J. E. Mark and J. Lal, 1982, ACS Symposium Series 193, American Chemical Society Washington D.C.):

$$\sigma_M = \frac{\sigma_E}{\lambda - \frac{1}{\lambda^2}}$$

A Mooney plot can now be constructed by plotting $\sigma_M$ versus 1/λ.

To be able to compare different materials, the relative Mooney stress is further used. The relative Mooney stress, $\sigma_{rM}$, is now defined as follows. First, determine the minimum of $\sigma_M$ for 1/λ≤0.8, which is further denoted as $\sigma_{M,min}$. Then the relative Mooney stress is given by:

$$\sigma_{rM} = \frac{\sigma_M}{\sigma_{M,min}}$$

The relative Mooney plot can then be constructed by plotting $\sigma_{rM}$ versus $1/\lambda$.

Figure 1:
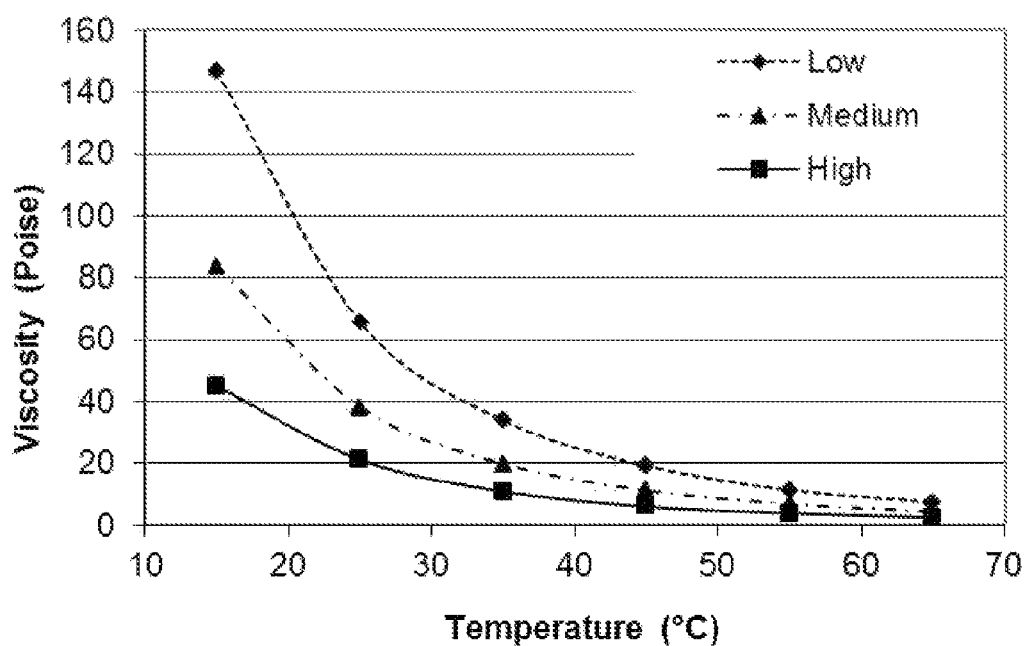
FIG. 1 is a graph of viscosity versus temperature showing manipulation of viscosity with varying low, medium, and high monomer/oligomer ratio.

In order to provide curable compositions with a viscosity that is in a range suitable for processing, the viscous oligomers may be diluted with low viscosity, radiation curable monomers with which the oligomers are compatible. The desired viscosity of the coating at application is preferably between 5 and 15 Poise and will be such that the set temperature of the water bath does not exceed 80° C. to achieve these viscosities. The viscosity of the formulation can be adjusted by: (a) Manipulating the monomer/oligomer ratio: in general, oligomers have a much higher viscosity than monomers. A higher monomer/oligomer ratio will decrease the overall viscosity of the formulation. A typical variation is shown in FIG. 1. (b) Changing the oligomer: this can range from changing the molecular weight of the oligomer, the composition of the oligomer (same components different ratios) or the use of a completely different oligomer. (c) Changing the monomers or using different combinations/ratios of monomers: different monomers have different viscosity curves. The effect may be less significant than when modifying the oligomer or monomer/oligomer ratios. (d) Adding a non-reactive component. It is worth noting that any of these adjustments may also change the mechanical properties of the coating as mentioned above.

Figure 2:
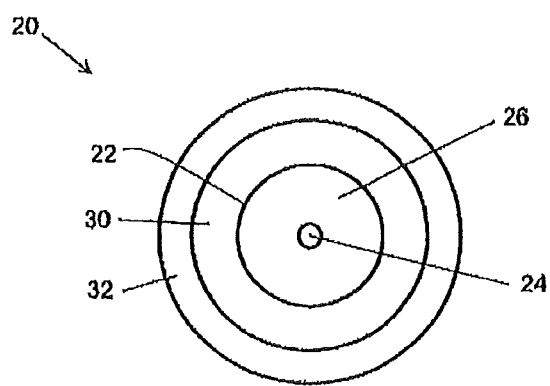
FIG. 2 is a schematic view of a coated optical fiber according to one embodiment of the present disclosure.

One embodiment of the present disclosure relates to a coated optical fiber. An example of a coated optical fiber is shown in schematic cross-sectional view in FIG. 2. Coated optical fiber 20 includes an optical fiber 22 having a core 24 and a cladding 26; and a primary coating 30 encapsulating the optical fiber. Fiber 22 is preferably formed of silica-based glass. Coated optical fiber 20 may also include a secondary coating 32 encapsulating the primary coating 30. In the coated optical fiber of FIG. 2, the primary coating 30 is applied directly to the surface of the optical fiber, and the secondary coating 32 is applied directly to the surface of the primary coating. A primary coating is a soft coating and defined as a coating with a $T_g$ of less than about −15° C. and an in situ modulus of less than about 2 MPa. The primary coating does not necessarily need to touch the glass fiber. There may be one or more coatings in between the primary coating and the glass fiber. As the skilled artisan will appreciate, in alternative embodiments of the disclosure, a thin (e.g., about 15 or less μm in thickness) layer of another coating may be formed between the optical fiber and the primary coating, and/or between the primary coating and the secondary coating. These layers are referred to as intermediate coating layers.

The optical fiber 22 includes a core and a cladding, as is familiar to the skilled artisan. The uncoated optical fiber may be a single mode fiber or a multimode fiber. The optical fiber may be adapted for use as a data transmission fiber such as G.652 compliant single- or multi-mode fiber. Alternatively, the optical fiber may perform an amplification, dispersion compensation, or polarization maintenance function, or may be used in short lengths in coupling optical devices. The skilled artisan will appreciate that the coatings described herein are suitable for use with virtually any optical fiber for which protection from the environment is desired.

In coated optical fiber 20, optical fiber 22 may be surrounded by a primary coating 30. In order to provide adequate cushioning and bend protection for the optical fiber, primary coating 30 has a Young's modulus of about 0.7 MPa or less, and preferably about 0.6 MPa or less, when measured as a cured film and an in-situ modulus of about 0.12 MPa or less when measured on fiber having a primary coating thickness of approximately 32.5 microns. Primary coating 30 may be applied with a lamp to speed ratio lower than 0.35, more preferably lower than 0.30, and most preferably lower than about 0.20, at draw speeds of greater than 20 m/s, more preferably greater than 25 m/s. When the primary coating thickness of fibers processed at such speeds is between about 20 and 25 microns, the primary in-situ modulus is preferably about 0.08 MPa or less. These primary in-situ modulus values are low compared to prior art compositions. For instance, Comparative Example 1 ("C1") (Example 8 from U.S. Pat. No. 7,221,842) has a low Young's modulus when measured on film (0.7 MPa). However, when C1 was applied to an optical fiber as a 32.5 micron primary coating layer using a lamp to speed ratio of 0.20, the measured primary in-situ modulus of fiber was 0.18 MPa, and when C1 was applied to an optical fiber as a 22.5 micron primary coating layer using a lamp to speed ratio of 0.20, the measured primary in-situ modulus of was 0.16 MPa.

As used herein, the Young's modulus of a primary coating is measured using a tensile testing instrument (e.g., a Sintech MTS Tensile Tester, or an Instron Universal Material Test System) on a sample of material shaped as a film between about 0.003" (76 μm) and 0.004" (102 μm) in thickness and about 1.3 cm in width, with a gauge length of 5.1 cm, and a test speed of 2.5 cm/min.

An important characteristic of primary coating compositions for optical fibers is that the coating has sufficient adhesion to glass in order to avoid delaminations which can be detrimental to the microbend performance of the optical fibers. This is not a problem in dry conditions but becomes challenging in high humidity conditions. It is desired to have a strong adhesion of the primary coating to the glass surface of the optical fiber, but not so strong that the fiber coating cannot be stripped from the fiber using conventional techniques. To improve adhesion of the coating to glass an adhesion promoter may be added to the formulation. Adhesion promoters typically contain a polymerizable organofunctional group (such as a (meth) acrylate) and a hydrolysable functional group. The hydrolyzed functional group reacts with the hydroxyl groups on the surface of the glass. However, condensation of the silanol groups can occur leading to reduced amount of available groups to react with the glass surface. This phenomenon is referred to as adhesion promoter degradation. Degradation of the adhesion promoter is unavoidable, what can be affected is the rate at which the adhesion promoter degrades. In order to reduce the rate of adhesion promoter degradation, the primary coatings disclosed herein may include a thiol compound, for example, Pentaerythritol mercaptopropionate. The rate of adhesion promoter degradation should be slowed sufficiently to allow at least a 6 month shelf life of the coating. Optical fibers have been prepared at high speeds with low modulus primary coatings disclosed herein. The fibers have been tested by different methods including but not limited to strip force, pull out and water soak test. All of the tested fibers have adequate performance, none of the fibers presented delaminations after soaking for at least 90 days. This includes the compositions that contained reduced amount of adhesion promoter (Example 7 vs. Example 6).

In order to be able to process the fibers at high speed the primary coating composition should preferably have a short gel time. The gel time is a measure of how quickly the curable composition forms a physically stable polymeric network, and so is highly related to the processability of the curable composition. Formulations presented herein have shorter or comparable gel times than typical commercial primary coatings (e.g., C2). Preferably the gel time is less than 1.1 seconds at room temperature. In the same manner cure speed of the formulations is higher or comparable to typical commercial primary coatings (e.g. C2) as shown in Table 5. Primary coating 30 is the cured reaction product of a primary curable composition having a short gel time. For example, in one embodiment of the present disclosure, the primary coating is the cured reaction product of a primary curable composition having a gel time less than about 1.4 seconds at a UV intensity of 1.9 mW/cm² between 325 nm and 425 nm (using a Green Spot™ UV source from UV Source Inc. with a mercury vapor lamp operating near 365 nm). Preferably, the primary curable composition has a gel time less than about 1.1 seconds at a UV intensity of 1.9 mW/cm² measured at the end of the light guide using an UV radiometer (SpotCure® UV intensity meter from EIT Inc.).

In general, compositions disclosed in U.S. Pat. No. 7,221, 842 have shorter gel time and faster cure than compositions disclosed herein. In addition, composition C1 has a primary in-situ modulus of 0.18 MPa when measured on fiber having a primary coating thickness of approximately 32.5 microns. There are a few examples (Examples 1, 2 and 6 in U.S. Pat. No. 7,221,842) that have reported a $T_g$ lower than −22° C. Examples 1 and 2 differentiate from the present disclosure in that they have a Young's modulus higher than about 0.7 MPa when measured as a cured film. Example 6 has a reported $T_g$ of −26° C. and a Young's modulus of 0.65 MPa when measured as a cured film; however it differentiates from the present invention in that the primary in-situ modulus is 0.18 MPa when measured on fiber having a primary coating thickness of approximately 32.5 microns.

Figure 3:
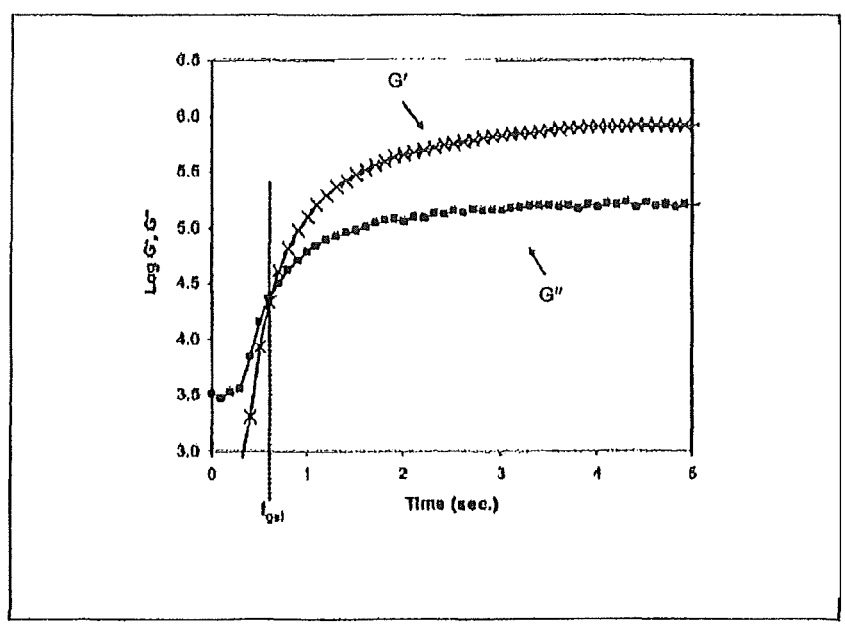
FIG. 3 is a typical plot of G' (elastic modulus) and G" (viscous modulus) vs. time used in determining the gel time of a curable composition.

As used herein, the gel time of a curable composition is defined as the time, under an exposure to a UV source of a given intensity, for a sample of the curable composition formed as a layer 25 µm in thickness to achieve a viscous modulus equal to its elastic modulus. This is shown graphically in FIG. 3. As time increases, the composition is cured by the exposure to UV, the viscous modulus G' increases, and the elastic modulus G" increases. At the gel time ($t_{gel}$ in FIG. 3), G' and G" have become equal.

Figure 4:
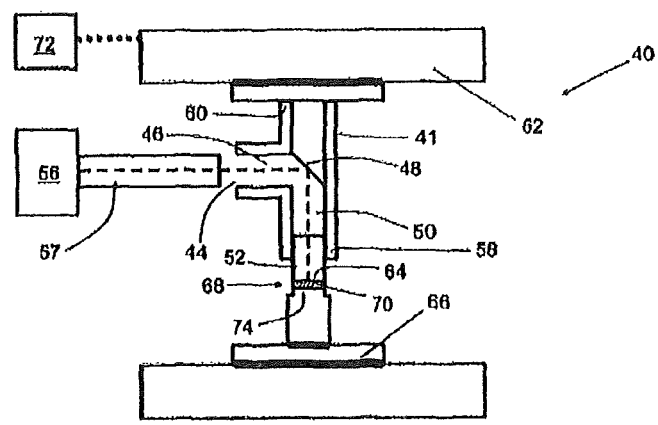
FIG. 4 is a schematic cross-sectional view of a dynamic photo-rheometry apparatus.

A schematic view of a suitable photo-rheometry apparatus 40 is given in FIG. 4. Rheometer body 41 includes an opening 44 and a passage 46 through which a UV light source 56 directs UV light (through a fiber optic light guide 57) to a mirror 48, which is angled to direct the UV light from UV light source 56 down the shaft 50 of rheometer body 41. A solid quartz cylinder 52 is attached to the proximal end 58 of rheometer body 41, and the distal end 60 of rheometer body 41 is coupled to a transducer 62. A suitable rheometer body 41 is the Rheometric RDA-II, originally available from Rheometric of Piscataway, N.J. The end 64 of the quartz cylinder 52 is mounted above an actuator 66, with a gap 68 formed between the end 64 of the quartz cylinder 52 and the plate 74. A sample 70 of the curable composition is filled into gap 68. A shutter is activated to allow the UV light to illuminate the sample for 4 seconds. It is worth noting that the UV exposure time should be longer than the gel time measured. While the sample 70 is cured using UV light from UV light source 56, the actuator 66 rotationally oscillates and dynamically shears sample 70 between the end 64 of quartz cylinder 52 and the plate 74 of actuator 66. The transducer 62 measures as a function of time during cure the torque exhibited by the sample in response to the oscillation of actuator 64. The transducer 62 is operatively coupled to data acquisition system 72 capable of acquiring torque and angular position at a rate of at least about 10 Hz and providing dynamic modulus, elastic modulus, and viscous modulus measurements continuously as the sample 70 cures.

In the gel time determination of the present disclosure, the rheometer is operated at room temperature at a frequency of 10 Hz and an oscillatory shear strain of about 30%. The UV light source is a GREEN SPOT-2 UV spot curing source, available from UV Source Inc., of Torrance Calif., coupled to a fiber optic light guide configured to deliver the UV light to the sample. In general the gel time and induction time decrease with increasing UV intensity. Since the lamp intensity of the Green Spot degrades over the life of the lamp, to 40% of initial output after 1000 lamp hours, it is very difficult to reproduce the exact curing conditions for gel time determinations over a period of time. However, it has been determined that for the same UV source the gel time ratio of a given sample to a measured control is fairly independent of UV intensity. Gel time determinations were performed with a combination of 0.3 and 0.4 neutral density filters located at the end of the light guide 57 so that the UV intensity is reduced prior to entering the rheometer. The combination of filters used must be selected such that the measured gel time for the control C1 is approximately 0.50±0.05 seconds. The thickness of the gap 68, and therefore of sample 70 was about 25 µm.

Primary coating 30 is preferably the cured reaction product of a primary curable composition having a spectroscopic cure speed of at least about 90%/second as determined by FTIR. More preferably, the primary curable composition has a spectroscopic cure speed of at least about 100%/second as determined by FTIR.

Figure 5:
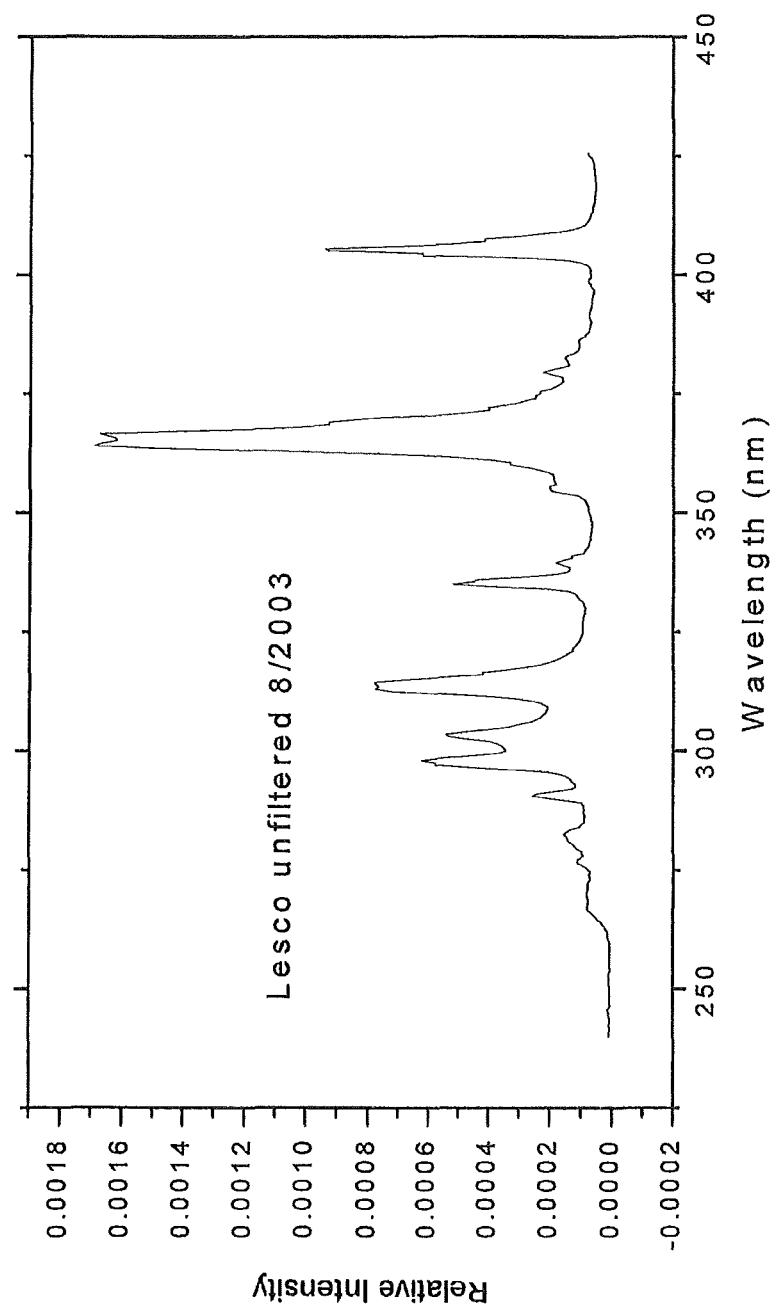
FIG. 5 is a plot showing the spectral output of the Lesco unfiltered UV source used in spectroscopic cure speed determinations.
Figure 6:
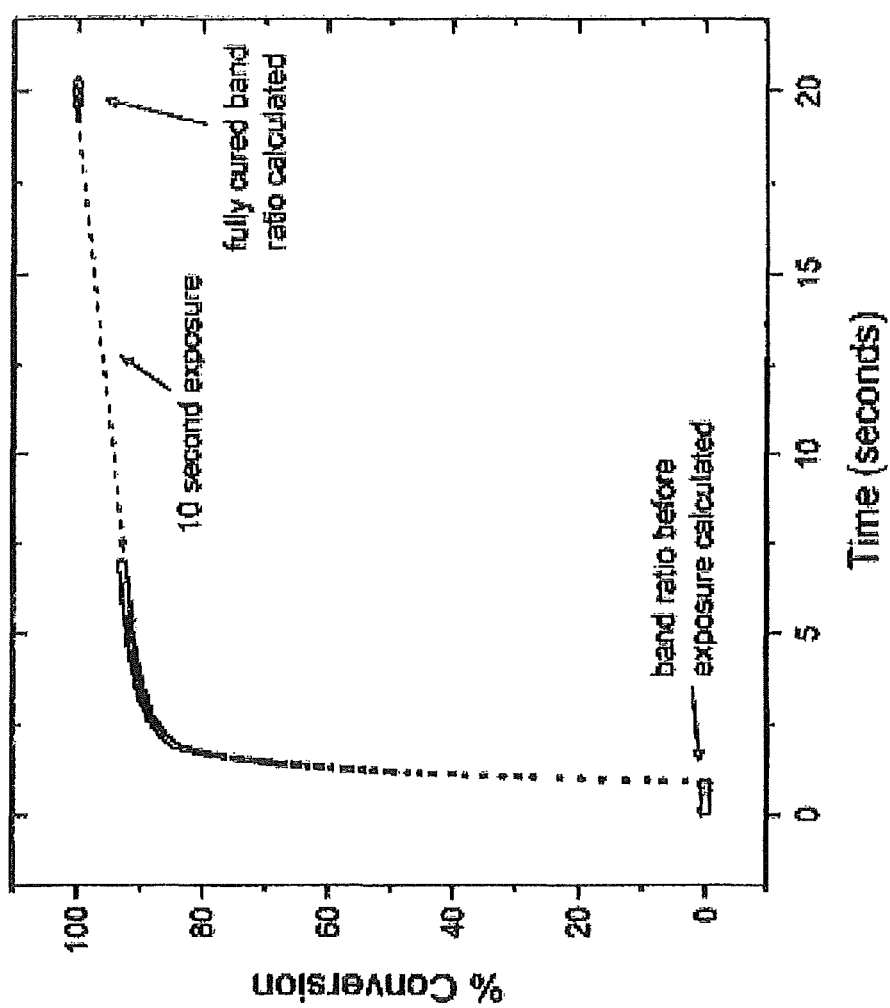
FIG. 6 is a plot of % conversion vs. time used in determining the spectroscopic cure speed of a curable composition where a is the band ratio before exposure is calculated, b is the 10 second exposure, and c is fully cured band ratio calculated.

The spectroscopic cure speed of a curable composition as used herein is determined by monitoring the acrylate bond conversion as a function of time using real time FTIR. The acrylate bond conversion is measured by monitoring the disappearance of an acrylate band at 1410 cm$^{-1}$. Films 25 µm in thickness were drawn directly on a 3-bounce diamond-coated ZnSe crystal in an ASI DURASAMPLIR accessory, and purged with nitrogen for 1 min. Mid-infrared spectra from 4000 cm$^{-1}$ to 650 cm$^{-1}$ were collected at 6 ms intervals using a Bruker IFS 66S spectrometer for 0.9 sec prior to UV exposure. UV radiation from a Lesco Mark II spot cure unit (Lightwave Energy Systems, Torrance, Calif.) was conducted through a liquid light guide to the sample. The unfiltered spectral output of the Lesco Mark II spot cure unit is shown in FIG. 5. A shutter is used to control the dose at the sample. In the spectroscopic cure speed determination detailed herein, the shutter was closed for the first 0.9 seconds in order to provide data for the determination of the band ratio before exposure. The shutter was opened and the sample irradiated for 1 second, then the shutter was closed for 7 seconds. The dose for a one second exposure time was 6.3 mJ/cm², as measured using an International Light IL390B light bug. Finally, the shutter was open and the sample irradiated for 10 seconds. FIG. 6 is a plot of % conversion vs. time for a typical spectroscopic cure speed determination. The % conversion is calculated as:

$$\%\text{conversion} = \frac{\text{peak area at time } t - \text{peak area before exposure}}{\text{fully cured peak area} - \text{peak area before exposure}}$$

The fully cured peak area is the peak area after the final 10 second exposure. The cure speed is calculated as the rate of % conversion in the linear region from 10% to 40% conversion.

The skilled artisan will appreciate that between different families of curable compositions, the relationship between gel time and spectroscopic cure speed can vary widely. For example, curable compositions that have different chemical makeup can have very different gel times, even if their spectroscopic cure speeds are similar. Further, as described in Gasper et al., "Integrated Approach to Studying the Development and Final Network Properties of Urethane Acrylate Coatings," *Macromolecules*, 39:2126-2136 (2006), which is hereby incorporated by reference in its entirety, the gel times of a series of related coating is not strictly related to their cure speeds. For example, a series of analogous coatings having increasing cure speeds can have decreasing gel times, or even increasing gel times.

The glass transition temperature of the primary coating is important to achieve good microbend performance of the fibers at low temperature. The glass transition temperature ($T_g$) of cured coating films in the present disclosure is below about −22° C., see Table 4. Primary coating 30 preferably has a glass transition temperature lower than the lowest projected use temperature of the coated optical fiber. For example, the primary coating preferably has a glass transition temperature of less than about −22° C. In more preferable embodiments of the disclosure, the primary coating has a glass transition temperature of about −25° C. or less. Primary coating 30 desirably has a higher refractive index than the cladding of the optical fiber in order to allow it to strip errant optical signals away from the core of optical fiber 24. In a typical optical fiber used for long-distance transmission of optical signals, the refractive index values at a wavelength of 1550 nm for the core and cladding are 1.447 and 1.436, respectively, as such, for typical silica based optical fibers, it is preferable that the refractive index of the primary coating be greater than 1.44 at 1550 nm. The primary coating should maintain adequate adhesion to the glass fiber during thermal and hydrolytic aging, yet be strippable therefrom for splicing purposes. The primary coating typically has a thickness in the range of 25-50 μm (e.g., about 32.5 μm). Primary coatings are typically applied to the optical fiber as a liquid and cured, as will be described in more detail herein below.

The polymeric material used as the primary coating in the present disclosure may be the cured product of a primary curable composition including an oligomer and at least one monomer. In some embodiments the oligomer may be a urethane acrylate oligomer. In some embodiments, the urethane acrylate oligomer may be comprised of isocyanate and said isocyanate may be aliphatic. In some embodiments, the urethane acrylate oligomer may be comprised of only one isocyanate and the sole isocyanate may be aliphatic. For example, the coating may comprise one or more monofunctional (meth) acrylate monomers in an amount of from about 5 to 95% by weight; an N-vinyl amide monomer in an amount of from about 0.1 to 40% by weight; and one or more difunctional urethane acrylate oligomers which comprise a polyol and an isocyanate, said oligomer present in an amount of from about 5 to 95% by weight, wherein the polyol in said oligomer is a polypropylene glycol and the isocyanate in said oligomer is an aliphatic diisocyanate. The isocyanate in said urethane acrylate oligomer may in some embodiments be comprised of only one type of isocyanate and that sole isocyanate may be an aliphatic isocyanate.

The primary curable composition used in forming the primary coating may also include photoinitiators, antioxidants, and other additives familiar to the skilled artisan. In some preferred embodiments of the disclosure, the oligomer and monomer(s) of the primary curable composition are ethylenically unsaturated. The oligomer and monomer(s) of the primary curable composition may be (meth) acrylate-based, for example, a urethane (meth) acrylate oligomer. However, as the skilled artisan will recognize, oligomers and monomers adapted for other curing chemistries, such as epoxy, vinyl ether, and thiol-ene, may be used.

The primary coating composition is preferably composed of one or more monofunctional (meth) acrylate monomers in an amount of 5 to 95% by weight, more preferably 30-75% by weight and most preferably 40 to 65% by weight. In some embodiments the monomer may include an N-vinyl amide monomer at a concentration of 0.1-40 wt %. In more preferred embodiments, the N-vinyl amide monomer is present in the primary curable composition in a concentration from 2-10 wt %. The composition is composed of one or more difunctional urethane acrylate oligomers in an amount of 5 to 95% by weight, more preferably 25 to 65% by weight and most preferably 35 to 55% by weight.

The monomers and oligomers utilized herein are selected to provide decreased gel times and low Young's moduli. For example, one preferred type of oligomer for use in providing curable compositions having decreased gel times and low moduli is a polyether urethane acrylate oligomer having a molecular weight between 3000 and 15000 Daltons. One preferred type of monomer for use in providing curable compositions having decreased gel times and low moduli is a monofunctional aliphatic epoxy acrylate monomer, such as lauryloxyglycidyl acrylate (e.g., CN130 available from Sartomer Company) and phenoxyglycidyl acrylate (e.g., CN131 available from Sartomer Company). It may be preferred to use the monofunctional aliphatic epoxy acrylate monomer at a concentration of 5-40 wt %. In some preferred embodiments, the monofunctional aliphatic epoxy acrylate monomer is present in the primary curable composition in a concentration from 10-30 wt %. Another preferred type of monomer for use in providing curable compositions having decreased gel times and low moduli is a multifunctional (meth) acrylate. As used herein, multifunctional (meth) acrylates have two or more polymerizable (meth) acrylate moieties per molecule. In certain preferred embodiments the multifunctional (meth) acrylate has three or more polymerizable (meth) acrylate moieties per molecule. Examples of multifunctional (meth) acrylates include dipentaerythritol monohydroxy pentaacrylate (e.g., PHOTOMER 4399 available from Cognis); methylolpropane polyacrylates with and without alkoxylation such as trimethylolpropane triacrylate, ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.). The multifunctional acrylate is preferably present in the primary curable composition at a concentration of 0.05-15 wt %. In some embodiments, the multifunctional (meth) acrylate monomer is present in the primary curable composition in a concentration from 0.1-10 wt %. Another preferred type of monomer for use in providing curable compositions having decreased gel times and low moduli is an N-vinyl amide, such as an N-vinyl lactam. Examples of N-vinyl amides include N-vinyl pyrrolidinone and N-vinyl caprolactam. It may be preferred to use the N-vinyl amide monomer at a concentration of 0.1-40 wt %. In more preferred embodiments, the N-vinyl amide monomer is present in the primary curable composition in a concentration from 2-10 wt %.

The oligomer may be an acrylate terminated oligomer. Preferred acrylate-terminated oligomers for use in the primary curable compositions include BR3731, BR3741, BR582 and KWS4131, from Bomar Specialty Co.; polyether urethane acrylate oligomers (e.g., CN986, available from Sartomer Company); polyester urethane acrylate oligomers (e.g., CN966 and CN973, available from Sartomer Company, and BR7432, available from Bomar Specialty Co.); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, each of which is incorporated herein by reference. The above-described oligomers may be used singly, or in combination to optimize multiple coating properties. The oligomer of the primary curable composition is preferably selected to provide the primary coating with the desired glass transition temperature and tensile properties. One type of desirable oligomer for use in the primary curable composition is an oligomer having a soft block having $M_n$ of about 4000 Daltons or greater. Examples of such oligomers are described in U.S. patent application Ser. No. 09/916,536, which is incorporated herein by reference in its entirety. Oligomers that are preferred for use in the primary coating compositions of the present disclosure have flexible backbones, low polydispersities, and yield cured coatings of low crosslink densities.

The total oligomer content of the primary curable composition may be between about 5 wt % and about 95 wt %. Desirably, the total oligomer content of the primary curable composition is between about 25 wt % and about 65 wt %. In some embodiments of the disclosure, the oligomer content of the primary curable composition is between about 35 wt % and about 55 wt %.

The monomer component of the primary curable composition is generally selected to be compatible with the oligomer, to provide a low viscosity formulation, and to increase the refractive index of the primary coating. One group of suitable monomers for use in the monomer component includes ethoxylated acrylates, ethoxylated alkylphenol monoacrylates, propylene oxide acrylates, n-propylene oxide acrylates, iso-propylene oxide acrylates, monofunctional acrylates, multifunctional acrylates, and combinations thereof. Preferred monomers include $R_2$—$R_1$—O—$(CH_2CH_3CH$—$O)_n$—$COCH$=$CH_2$, where $R_1$ and $R_2$ are aliphatic, aromatic, or a mixture of both, and n=1 to 10, and $R_1$—O—$(CH_2CH_3CH$—$O)_n$—$COCH$=$CH_2$, where $R_1$ is aliphatic or aromatic, and n=1 to 10. Specific examples include ethylenically unsaturated monomers including lauryl acrylate (e.g., SR335 available from Sartomer Company, Inc., AGEFLEX FA12 available from Ciba (Basel), and PHOTOMER 4812 available from Cognis (Ambler, Pa.)), ethoxylated nonylphenol acrylate (e.g., SR504 available from Sartomer Company, Inc. and PHOTOMER 4003 available from Cognis), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from Ciba (Basel), and PHOTOMER 4035 available from Cognis), isooctyl acrylate (e.g., SR440 available from Sartomer Company, Inc. and AGEFLEX FA8 available from Ciba), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from Ciba), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), and combinations thereof.

In some embodiments, it may be preferred to use a hydroxyfunctional monomer in the primary curable composition. A hydroxyfunctional monomer is a monomer that has a pendant hydroxy moiety in addition to an oligomer-reactive functionality (e.g., acrylate). Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth) acrylate, and 4-hydroxybutyl (meth)acrylate (each available from Aldrich). The hydroxyfunctional monomer may be present in an amount sufficient to improve adhesion of the primary coating to the optical fiber. For example, the hydroxyfunctional monomer may be present in an amount between about 0.1 wt % and about 25 wt % of the primary curable composition. Furthermore, the hydroxyfunctional monomer may be present in an amount between about 5 wt % and about 8 wt % of the primary curable composition. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the specification of which is hereby incorporated by reference in its entirety.

The total monomer content of the primary curable composition may be between about 5 wt % and about 95 wt %. Preferably, the total monomer content of the primary curable composition is between about 30 wt % and about 75 wt %. In some embodiments, the monomer content of the primary curable composition is between about 40 wt % and about 65 wt %.

Through variation of the oligomers and the polyols from which they are based, coatings having the desired properties (e.g., $T_g$, modulus, elongation) can be prepared in accordance with the present disclosure. The mechanical properties of these coatings can be adjusted by the choice of the oligomer and the monomer component and the monomer/oligomer ratio. An example of properties of formulations with different monomer/oligomer ratio is shown in Table 1 below, wherein the Young's modulus is measured as a cured film.

TABLE 1

Impact of modifying monomer/oligomer ratio on coating properties

| Description | Young's modulus (MPa) | Elongation at break (%) | $T_g$ (°C.) |
|---|---|---|---|
| Low monomer/oligomer ratio Medium-Low | 0.62 ± 0.06 | 135.4 ± 18.6 | −25.9 |

TABLE 1-continued

Impact of modifying monomer/oligomer ratio on coating properties

| Description | Young's modulus (MPa) | Elongation at break (%) | $T_g$ (° C.) |
|---|---|---|---|
| monomer/oligomer ratio Medium-High | 0.58 ± 0.05 | 132.4 ± 30.9 | −26.6 |
| monomer/oligomer ratio | 0.49 ± 0.05 | 145.9 ± 14.9 | −23.9 |
| High monomer/oligomer ratio | 0.43 ± 0.09 | 153.3 ± 15.5 | −22.6 |

In order to provide curable compositions with a viscosity that is in a range suitable for processing, the viscous oligomers may be diluted with low viscosity, radiation curable monomers with which the oligomers are compatible. In some embodiments, it may be preferable for the oligomers and monomers to be chosen to provide a hydrophilic primary coating, as suggested in U.S. patent application Ser. No. 10/675,720, entitled "COATED OPTICAL FIBER AND OPTICAL FIBER COATING SYSTEM INCLUDING A HYDROPHILIC PRIMARY COATING," which is hereby incorporated by reference in its entirety.

Preferred monomers include low viscosity (e.g. lower than 20 Poise at 25° C.) materials with a low homopolymer glass transition temperature, which can readily dissolve the oligomer and which does not negatively impact the mechanical properties of the cured coating. In addition to low $T_g$ and suitable viscosity, the selection of the oligomer and monomer combinations may be influenced by other desirable properties for optical fibers. These additional properties include suitably high refractive index, good optical clarity, low oil sensitivity, high thermal and light resistance, low extractable content, and fast cure.

The primary curable composition may also contain a polymerization initiator which is suitable to cause polymerization (i.e., curing) of the composition after its application to an optical fiber. Polymerization initiators suitable for use in the primary curable compositions of the present disclosure include thermal initiators, chemical initiators, electron beam initiators, and photoinitiators. Particularly preferred are the photoinitiators. For most acrylate-based coating formulations, conventional photoinitiators, such as ketonic photoinitiating and/or phosphine oxide additives, are preferred. When used in the compositions of the present disclosure, the photoinitiator is present in an amount sufficient to provide rapid ultraviolet curing.

Suitable photoinitiators include 1-hydroxycyclohexylphenyl ketone (e.g., IRGACURE 184 available from Ciba Specialty Chemical (Hawthorne, N.Y.); bis(2,6-dimethoxybenzoyl)-2,4,4-trimethylpentylphosphine oxide (e.g., commercial blends IRGACURE 1800, 1850, and 1700 available from Ciba Specialty Chemical); 2,2-dimethoxy-2-phenylacetophenone (e.g., IRGACURE 651, available from Ciba Specialty Chemical); bis(2,4,6-trimethylbenzoyl)phenylphosphine oxide (IRGACURE 819); (2,4,6-trimethylbenzoyl)diphenyl phosphine oxide (LUCIRIN TPO, available from BASF (Munich, Germany)); ethoxy(2,4,6-trimethylbenzoyl)phenylphosphine oxide (LUCIRIN TPO-L from BASF); and combinations thereof (2,4,6-trimethylbenzoyl) diphenyl phosphine oxide (LUCIRIN TPO, available from BASF (Munich, Germany)) and ethoxy(2,4,6-trimethylbenzoyl)phenylphosphine oxide (LUCIRIN TPO-L from BASF) are particularly preferred.

The total photoinitiator content of the primary curable composition may be up to about 10 wt %. Desirably, the total photoinitiator content of the primary curable composition is between about 0.5 wt % and about 6 wt %. The photoinitiator component of the primary curable composition may consist of a single photoinitiator; alternatively, two or more photoinitiators may be combined to lend a desired curing property to the primary curable composition. For example, a combination of IRGACURE 819 and IRGACURE 184 may be used to ensure adequate surface cure as well as complete cure of the bulk primary coating material.

The photoinitiator, when used in a small but effective amount to promote radiation cure, provides reasonable cure speed without causing premature gelation of the coating composition. A preferred dosage for coating thicknesses of about 25-35 μm is, for example, less than about 1.0 J/cm², preferably less than about 0.5 J/cm².

As used herein, the weight percent of a particular component in a curable composition refers to the amount introduced into the bulk curable composition excluding an additional adhesion promoter and other additives. The amount of additional adhesion promoter and various other additives that are introduced into the curable composition to produce a composition of the present disclosure is listed in parts per hundred. For example, a monomer, oligomer, and photoinitiator are combined to form the curable composition such that the total weight percent of these components equals 100 percent. To this bulk curable composition, an amount of an additional adhesion promoter, for example 1.0 part per hundred, can be employed in excess of the 100 weight percent of the bulk composition.

It may be desirable to include an adhesion promoter in the primary curable composition. In one embodiment, an adhesion promoter is present in the primary curable composition in an amount between about 0.02 to about 10 parts per hundred, more preferably between about 0.05 to about 4 parts per hundred, most preferably between about 0.1 to about 2 parts per hundred. In some embodiments, the adhesion promoter is present in an amount of about 0.1 to about 1 pph. Suitable adhesion promoters include alkoxysilanes, organotitanates, and zirconates. Preferred adhesion promoters include 3-mercaptopropyltrialkoxysilane (e.g., 3-MPTMS, available from Gelest (Tullytown, Pa.)); bis(trialkoxysilylethyl)benzene, acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, issued Nov. 13, 2001, which is hereby incorporated by reference in its entirety. The skilled artisan may use other conventional adhesion promoters in the primary curable compositions used in the present disclosure.

In addition to the above-described components, the primary curable composition of the present disclosure can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary curable composition. Others can affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, each of which is hereby incorporated herein by reference.

The primary coating composition may also include a strength additive, as described in U.S. patent application Ser. No. 10/077,166, which is hereby incorporated herein by reference in its entirety. Desirable strength additives include mercapto-functional compounds, such as N-(tert-butoxycarbonyl)-L-cysteine methyl ester, pentaerythritol tetrakis(3-mercaptopropionate); (3-mercaptopropyl)-trimethoxysilane; (3-mercaptopropyl)trimethoxysilane; and dodecyl mercaptan. The strength additive is desirably present in the primary curable composition in an amount less than about 1 pph. More desirably, the strength additive is present in the primary curable composition in an amount less than about 0.5 pph. In some embodiments, the strength additive is present in the primary curable composition in an amount between about 0.01 pph and about 0.1 pph.

A preferred antioxidant is thiodiethylene bis[3-(3,5-di-tert-butyl)-4-hydroxyphenyl) propionate] (e.g., IRGANOX 1035, available from Ciba Specialty Chemical).

The composition can further include additional additives such as waxes, lubricants, slip agents, as well as other additives known in the art.

Certain additives may be useful in providing primary curable compositions having decreased gel times and low moduli. For example, it may be desirable for the skilled artisan to include in the primary curable composition an optical brightener, such as UVITEX OB, available from Ciba; Blankophor KLA, available from Bayer, bisbenzoxazole compounds; phenylcoumarin compounds; and bis(styryl)biphenyl compounds. The optical brightener is desirably present in the primary curable composition at a concentration of 0.005-0.3 pph. It may also be desirable to include in the primary curable composition an amine synergist, such as triethanolamine; 1,4-diazabicyclo[2.2.2]octane (DABCO); methyldiethanolamine; and triethylamine. The amine synergist is desirably present in the primary curable composition at a concentration of 0.02 pph-0.5 pph.

In coated optical fiber 20 of FIG. 1, primary coating 30 is surrounded by secondary coating 32. While in FIG. 1, the secondary coating is shown as being applied directly to the primary coating, the skilled artisan will recognize that in alternative embodiments there may be one or more intermediate coating layers deposited between the primary coating and the secondary coating. Secondary coating 32 is formed from a cured polymeric material, and typically has a thickness in the range of 20-35 µm (e.g., about 27.5 µm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating). While the coated optical fiber 20 of FIG. 1 includes a secondary coating, the skilled artisan will appreciate that the coated optical fibers of the present disclosure need not have a secondary coating; they may include an optical fiber and a primary coating, but lack a secondary coating. Suitable secondary coatings may be found for example, in U.S. patent application Ser. No. 10/840,454, entitled "OPTICAL FIBER COATING SYSTEM AND COATED OPTICAL FIBER"; and U.S. patent application Ser. No. 10/454,984, entitled "COATED OPTICAL FIBER, METHOD FOR MAKING COATED OPTICAL FIBER, AND CURABLE COMPOSITIONS FOR COATING OPTICAL FIBER," each of which is hereby incorporated herein by reference in its entirety. Secondary curable compositions having low oligomer content are described in more detail in U.S. patent application Ser. No. 09/722,895, and U.S. Pat. No. 6,775,451 which is incorporated herein by reference in its entirety. Other suitable materials for use in secondary coating materials, as well as considerations related to selection of these materials, are well known in the art and are described in U.S. Pat. Nos. 4,962,992 and 5,104,433 to Chapin, which are hereby incorporated herein by reference.

Another embodiment of the present disclosure relates to a method of making an optical fiber including the primary coating described hereinabove. This method can generally be performed by standard methods with the use of a coating system of the present disclosure, e.g. by comparing the gel time of coating composition herein with the gel time of a comparative coating. For example, a method according to one embodiment includes the steps of providing a bare optical fiber (e.g., fabricated using methods familiar to the skilled artisan), coating the optical fiber with a primary curable composition having a gel time ratio to comparative coating C1 which is less than about 2 at an light intensity sufficient to yield a gel time for coating C1 which is 0.50±0.05 seconds. Such coatings may be employed as the cured primary curable composition to form a primary coating encapsulating the optical fiber, the primary coating having a Young's modulus of about 0.7 MPa or less when measured as a cured film. Gel time ratio as used herein is defined as the quotient of the gel time of the composition and the gel time of the control composition C1 having measured both with the same set up and with a light intensity such that the gel time of C1 is 0.50±0.05 seconds. In order to provide an optical fiber having both primary and secondary coatings, it may be desirable to apply a secondary curable composition to the coated glass fiber, and polymerize the secondary curable composition to form the secondary coating of the optical fiber. Optionally, the secondary curable composition can be applied to the coated fiber before polymerizing the primary curable composition, in which case only a single polymerization step is employed.

The primary and secondary curable compositions are coated on an optical fiber using conventional processes, for example, on a draw tower. It is well known to draw glass optical fibers from a specially prepared, cylindrical glass optical fiber preform which has been locally and symmetrically heated to a temperature, e.g., of about 2000° C. As the preform is heated, such as by feeding the preform into and through a furnace, a glass optical fiber is drawn from the molten material. One or more curable compositions are applied to the glass fiber after it has been drawn from the preform, preferably immediately after cooling. The curable compositions are then cured to produce the coated optical fiber. The method of curing can be thermal, chemical, or radiation induced, such as by exposing the applied (and uncured) curable composition on the glass fiber to ultraviolet light, actinic radiation, microwave radiation, or electron beam, depending upon the nature of the coating composition(s) and polymerization initiator being employed. It is frequently advantageous to apply both a primary curable composition and any secondary curable compositions in sequence following the draw process. One method of applying dual layers of curable compositions to a moving glass fiber is disclosed in U.S. Pat. No. 4,474,830 to Taylor, which is hereby incorporated by reference. Another method for applying dual layers of curable compositions onto a glass fiber is disclosed in U.S. Pat. No. 4,585,165 to Iversen, which is hereby incorporated by reference. Of course, the primary curable composition can be applied and cured to form the primary coating material, then the secondary curable composition can be applied and cured to form the cured polymeric material of the secondary coating.

The coated optical fibers disclosed herein are suitable for use in an optical fiber cable including at least one coated optical fiber as described hereinabove.

These curable compositions have a gel time ratio relative to C1 of less than about 2, more preferably less than about 1.9 and most preferably less than 1.8 at an intensity such that the gel time of C1 is 0.50±0.05, wherein a substantially cured reaction product of the curable composition has a Young's modulus of about 0.7 MPa or less when measured on cured films. The curable compositions may include a polyether or polyester urethane (meth)acrylate oligomer, monofunctional (meth)acrylate monomer and an N-vinyl amide monomer, desirably in the concentrations described above. The curable compositions may also include an optical brightener and/or an amine synergist, also desirably in the concentrations described above.

EXAMPLES

Test Methods

Tensile Testing and $T_g$

Primary curable compositions 2-8 and comparative primary curable compositions C1-C5 were cured into films for testing of mechanical properties. Wet films were cast on silicone release paper with the aid of a draw-down box having an about 0.005" gap thickness. Films were cured with 1.2 J/cm² UV dose (measured over a wavelength range of 225-424 nm by a Light Bug model IL490 from International Light) by a Fusion Systems UV curing apparatus with a 600 W/in D-bulb (50% Power and approximately 12 ft/min belt speed) to yield primary coatings 2-8 and comparative primary coatings C1-C5 in film form. Cured film thickness was between about 0.003" and 0.004".

The films were allowed to age (23° C., 50% relative humidity) for at least 16 hours prior to testing. Film samples were cut to specified dimensions of 15 cm×1.3 using a cutting template and a scalpel. Young's modulus, tensile strength at break, and elongation at break were measured using a MTS Sintech tensile tester. Films were tested at an elongation rate of 2.5 cm/min with the initial gage length of 5.1 cm.

Glass transition temperatures of the cured films were determined by determining the peak of the tan δ curves measured on a Rheometrics DMTA IV in tension at a frequency of 1 Hz. The glass transition temperature ($T_g$) refers to the temperature below which a coating material is brittle and above which it is flexible. An alternative (and more accurate) definition is based on the fact that at the glass transition temperature, the coefficient of thermal expansion changes sharply. The glass transition temperature can be a single degree or a short range of degrees. The glass transition temperature ($T_g$) of polymeric materials may be measured by a variety of techniques such as differential scanning calorimetry (DSC) or dynamic mechanical analysis (DMA). The coatings evaluated in this body of work were done so by the use of the DMA. The samples were run using a DMA instrument in tension mode at a frequency of 1 Hz. The samples were evaluated at a temperature range of −50° C. to 150° C. In DMA analysis (and in the data presented in this application) the value for the $T_g$ is frequently defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation. See Ferry, J. D. In *Viscoelastic Properties of Polymers*, 3$^{rd}$ ed., Wiley: New York (1980), Chapter 1, which is hereby incorporated by reference in its entirety. The maximum value of the tan delta peak, while serving as a convenient measure of the $T_g$, typically exceeds the value that is obtained when the $T_g$ is measured by methods such as DSC.

Water Soak Test

To determine the coatings resistance to moisture exposure, fibers were immersed in deionized water at room temperature and 65° C. for 60 days. Room temperature samples were placed into covered petri dishes which were filled with deionized water. The 65° C. samples were suspended in a water bath which was equipped with an auto fill feature. The auto fill feature compensates for the loss of water due to evaporation and fills the bath to the required level from the water source. The ends of the fiber coils were fixed so they were not submerged in water to determine if water can penetrate through the coatings and not be absorbed through the ends. Coils of desired length were immersed in water. Samples were observed prior to water immersion and after 14, 30, 60 and 90 days. Ten centimeters of each sample was observed under a microscope at 100× in index matching fluid. Delaminations are observed when the primary coating separates from the glass due to exposure to water. They can be seen at the primary coating/glass interface as a dark region and are typically round in shape, but can be elongated due to the physical structure of optical fiber. It is recommended to observe delaminations immediately after removing fiber from water as water dissipates with time, and delaminations can heal.

Viscosity

A Brookfield CAP2000 (with a spindle #4 cone and plate at a speed of 50 rpm at 25° C., 100 rpm at 35° C., and 150 rpm at 45° C.) viscometer was used. A volume (124 μL) of the composition was placed on the plate and the cone lowered to cover the sample. The sample was heated to either 15° C., 25° C., 35° C., 45° C., 55° C. and 65° C. and the speed of the spindle adjusted as reported in Table 3. After reaching the desired temperature, viscosity readings were obtained from the viscometer.

Primary In-Situ Modulus

A six inch sample of fiber to be measured is obtained. A one inch section from the center of the six inch sample is window stripped with an appropriate tool and wiped with isopropyl alcohol. The sample is mounted on a sample holder/alignment stage equipped with 10×5 mm aluminum tabs to which the sample is to be glued to. Two tabs are set so that the 10 mm length is laid horizontally and a 5 mm gap is between two tabs. The fiber is laid horizontally on the sample holder across the tabs so that the coated end of fiber is on one tab extending halfway into the 5 mm space between the tabs and the stripped glass is over the other half of the 5 mm gap and the other tab. The sample is lined up and then moved out of the way so a small dot of Krazy glue can be applied to the half of each tab closest to the 5 mm gap. The fiber is then brought back over the tabs and centered. The alignment stage is then raised until the glue just touches the fiber. The coated end is then pulled through the glue such that the majority of the sample in the 5 mm gap between the tabs is stripped glass. The very tip of the coated end is left extended beyond the glue on the tab so the region to which will be measured is left exposed. The sample is left to dry. The length of fiber fixed to the tabs is trimmed to 5 mm. The coated length embedded in glue, the non-embedded length (between the tabs), and the primary diameter are measured.

Measurements are performed on the Rheometrics DMTA IV at a constant strain of 9e-6 1/s for a time of forty-five minutes at room temperature (21 C). The gauge length is 15 mm. Force and delta length are recorded and used for the calculation of primary modulus. Samples are prepared by removing any epoxy from the tabs that would interfere with the 15 mm clamping length to insure there is no contact with the fiber and that the sample is secured squarely to the clamps. Once the instrument force is zeroed out, the non-coated end is mounted to the lower clamp (measurement probe) followed by the tab containing the coated end of the fiber being mounted to the upper (fixed) clamp. The test is then executed and the sample removed once the analysis is completed.

promoter available from Gelest. Pentaerythritol mercaptopropionate is available from Aldrich. UVITEX OB is an optical brightener available from Ciba. The oligomer and monomer(s) were blended together for at least 10 minutes at 60° C. Photoinitiator(s) and additives were then added, and blending was continued for one hour. Finally, the adhesion promoter was added, and blending was continued for 30 minutes. The components used to formulate primary curable compositions 2-8 and comparative primary curable composition C1 are detailed below in Table 2. Comparative primary coatings C2, C3 and C4 are commercial coatings.

TABLE 2

Formulations

| | Composition | | | | | | | | |
|---|---|---|---|---|---|---|---|---|---|
| Component | C1 | 2 | 3 | 4 | 5 | 6 | 7 | 8 | 9 |
| Photomer 4003 (wt %) | 40 | 41.5 | 0 | 61.5 | 41.5 | 46.5 | 46.5 | 45.5 | 47 |
| Photomer 4960 (wt %) | 0 | 0 | 41.5 | 0 | 0 | 0 | 0 | 0 | 0 |
| BR3741 (wt %) | 52 | 55 | 55 | 35 | 55 | 50 | 50 | 50 | 50 |
| n-vinyl caprolactam (wt %) | 5 | 2 | 2 | 2 | 2 | 2 | 2 | 2 | 1.5 |
| Irgacure 819 (wt %) | 1.5 | 0 | 0 | 0 | 0 | 0 | 0 | 0 | 0 |
| Irgacure 184 (wt %) | 1.5 | 0 | 0 | 0 | 0 | 0 | 0 | 0 | 0 |
| TPO (wt %) | 0 | 1.5 | 1.5 | 1.5 | 1.5 | 1.5 | 1.5 | 2.5 | 1.5 |
| (3-acryloxypropyl) trimethoxysilane (pph) | 1 | 1 | 1 | 1 | 1 | 1 | 0.8 | 0.8 | 0.8 |
| Irganox 1035 (pph) | 1 | 1 | 1 | 1 | 1 | 1 | 1 | 1 | 1 |
| Pentaerythritol mercaptopropionate (pph) | 0 | 0.03 | 0.03 | 0.03 | 0.03 | 0.03 | 0.03 | 0.03 | 0.03 |
| Uvitex OB | 0 | 0.05 | 0 | 0 | 0 | 0 | 0 | 0 | 0 |

C1 is composition Example 8 in U.S. Pat. No. 7,221,842

Primary Diameter Variability

Primary diameter variability is defined as the delta between the maximum measured diameter and minimum measured diameter for a single fiber. Diameter is measured from the side view of the fiber. The distribution of primary diameter variability is plotted and the value at 80% is recorded. To construct a more meaningful distribution curve, it is desirable that several dozen reels of fiber be made and measured.

The following examples are meant to be exemplary only, and non-limiting.

Example 1

Primary curable compositions 2-9 and comparative primary curable composition C1 and C5 were formulated using a high-speed mixer in an appropriate container heated to 60° C. with a heating band or heating mantle. In each case, the components were weighed into the container using a balance and allowed to mix until the solid components were thoroughly dissolved and the mixture appeared homogeneous. Curable compositions are formulated such that the amounts of oligomer, monomer, and photoinitiator total 100 wt %; other additives are added to the total mixture in units of pph. BR3741 is an aliphatic urethane acrylate oligomer available from Bomar Specialties. PHOTOMER 4003 is an ethoxylated nonylphenol acrylate monomer available from Cognis. PHOTOMER 4960 is a propoxylated nonylphenol acrylate monomer available from Cognis. N-vinyl caprolactam is available from ISP Technologies, Inc. IRGACURE 819 and IRGACURE 184 are photoinitiators available from Ciba Specialty Chemical. TPO is a photoinitiator available from BASF. IRGANOX 1035 is an antioxidant available from Ciba. (3-acryloxypropyl) trimethoxysilane is an adhesion Primary curable compositions 2-9 and comparative primary curable compositions C1 and C5 (any composition identified herein as a "C" coating, e.g. C1 and C2, etc, are comparative coatings) were cured into films for testing of mechanical properties. Wet films were cast on silicone release paper with the aid of a draw-down box having an about 0.005" gap thickness. Films were cured using a Fusion Systems UV curing apparatus with a 600 W/in D-bulb (50% power, 10 ft/min belt speed, nitrogen purge) to yield primary coatings 2-9 and comparative primary coatings C1 and C5 in film form. Cured film thickness was between about 0.003" and 0.004".

The films were allowed to age (23° C., 50% relative humidity) for at least 16 hours prior to testing. Film samples were cut to a specified length and width (about 15 cm×about 1.3 cm). Young's modulus, tensile strength at break, and elongation at break were measured using a MTS Sintech tensile tester. Films were tested at an elongation rate of 2.5 cm/min starting from an initial jaw separation (gage length) of 5.1 cm. Glass transition temperatures of the cured films were determined by determining the peak of the tan δ curves measured on a Rheometrics DMTA IV in tension at a frequency of 1 Hz. Thermal and mechanical properties (tested in accordance with ASTM 82-997) of the cured films are reported in Table 3, below:

TABLE 3

| Viscosity of primary coating (Poise) | | | | | | | |
|---|---|---|---|---|---|---|---|
| T (° C.) | rpm | C2 | C3 | C4 | C1 | 4 | 5 | 6 |
| 15 | 50 | 150.3 | 150.0 | 144.3 | 108.3 | 45.0 | 139.5 | 105.0 |
| 25 | 50 | 60.3 | 69.0 | 63.0 | 51.6 | 21.1 | 63.0 | 48.6 |

TABLE 3-continued

Viscosity of primary coating (Poise)

| T (° C.) | rpm | C2 | C3 | C4 | C1 | 4 | 5 | 6 |
|---|---|---|---|---|---|---|---|---|
| 35 | 100 | 26.8 | 36.0 | 30.6 | 26.8 | 11.0 | 33.0 | 24.7 |
| 45 | 150 | 13.6 | 20.0 | 16.8 | 15.4 | 6.1 | 18.4 | 14.0 |
| 55 | 250 | 7.7 | 12.2 | 9.8 | 9.5 | 3.9 | 11.2 | 8.6 |
| 65 | 350 | 4.6 | 8.1 | 6.2 | 6.3 | 2.6 | 7.3 | 5.7 |
| 75 | 400 | 3.0 | 5.7 | 4.2 | 4.4 | ND | 5.1 | 3.9 |

TABLE 4

Tensile properties of primary coating

| Formulation | Young's modulus (MPa) | Tensile strength (MPa) | Elongation at break (%) | $T_g$ (° C.) |
|---|---|---|---|---|
| C1 | 0.70 ± 0.06 | 0.50 ± 0.12 | 109.0± 19.7 | ND |
| C2 | 1.31 ± 0.13 | 0.65 ± 0.20 | 85.3 ± 36.6 | −18.5 |
| C3 | 0.81 ± 0.05 | 0.70 ± 0.09 | 121.6 ± 8.8 | −27.8 |
| C4 | 0.79 ± 0.05 | 0.50 ± 0.12 | 130.5 ± 27.1 | −27.7 |
| C5* | 0.62 ± 0.06 | 0.52 ± 0.09 | 119.0± 17.4 | ND |
| 2 | 0.63 ± 0.08 | 0.50 ± 0.06 | 154.5 ± 15.7 | −27.2 |
| 3 | 0.55 ± 0.05 | 0.46 ± 0.11 | 188.5 ± 40.6 | −26.0 |
| 4 | 0.43 ± 0.09 | 0.40 ± 0.10 | 153.3 ± 15.5 | −22.6 |
| 5 | 0.62 ± 0.06 | 0.48 ± 0.13 | 135.4± 18.6 | −25.9 |
| 6 | 0.58 ± 0.05 | 0.45 ± 0.14 | 132.4 ± 30.9 | −26.6 |
| 7 | 0.56 ± 0.06 | 0.47 ± 0.11 | 142.4 ± 24.2 | −26.8 |
| 8 | 0.55 ± 0.05 | 0.46 ± 0.11 | 140.2 ± 17.7 | −25.5 |

C5 is composition Example 6 in U.S. Pat. No. 7,221,842

Gel times and spectroscopic cure speeds for primary curable compositions 2-9 and comparative primary curable composition C1 were determined using the test methods described above. Spectroscopic cure speeds are given in Table 5 below. Gel time and gel time ratio relative to C1 at a UV intensity such that the gel time of C1 is 0.50±0.05 are given in Table 6, below. Gel time ratios are calculated from averages of two runs, and spectroscopic cure speeds are averages of three runs. Elongation at break is 110%, preferably 125%, more preferably 130%, and most preferably 135%.

While the cure speed of comparative primary coating composition C1 is comparable to that of primary curable compositions 1-8, the gel times of primary curable compositions 1-8 are shorter than that of comparative primary coating composition C1.

TABLE 5

Cure speed of primary coating formulations at room temperature

| | Cure speed (%/s) |
|---|---|
| C1 | 154 ± 2 |
| C2 | 71 ± 1 |
| 7 | 95 ± 2 |
| 5 | 109 ± 2 |
| 6 | 93 ± 1 |

TABLE 6

Gel time of primary coating formulations at room temperature

| Formulation | Gel time (s) | Gel time ratio to C1 (s/s) |
|---|---|---|
| C1 | 0.49 | 1 |
| C2 | 1.36 | 2.79 |

TABLE 6-continued

Gel time of primary coating formulations at room temperature

| Formulation | Gel time (s) | Gel time ratio to C1 (s/s) |
|---|---|---|
| C3 | 0.58 | 1.18 |
| C4 | 1.02 | 2.09 |
| 2 | 0.76 | 1.56 |
| 5 | 0.69 | 1.42 |
| 6 | 0.69 | 1.42 |
| 7 | 0.69 | 1.41 |
| 8 | 0.55 | 1.13 |
| 9 | 0.74 | 1.52 |

TABLE 7

Primary in-situ modulus

| Primary Coating | Primary coating thickness (μm) | Primary in-situ Modulus (MPa) |
|---|---|---|
| C2 | 32.5 | 0.429 ± 0.029 |
| C3 | 32.5 | 0.131 ± 0.009 |
| C4 | 32.5 | 0.227 ± 0.003 |
| C1 | 32.5 | 0.178 ± 0.004 |
| C1 | 22.5 | 0.158 ± 0.010 |
| C5 | 32.5 | 0.175 ± 0.003 |
| 2 | 32.5 | 0.049 ± 0.009 |
| 5 | 32.5 | 0.114 ± 0.006 |
| 5 | 32.5 | 0.075 ± 0.003 |
| 7 | 32.5 | 0.060 ± 0.007 |
| 7 | 22.5 | 0.049 ± 0.008 |
| 9 | 32.5 | 0.055 ± 0.002 |
| 9 | 22.5 | 0.013 ± 0.001 |
| 6 | 32.5 | 0.045 ± 0.002 |
| 6 | 22.5 | 0.047 ± 0.020 |
| 8 | 32.5 | 0.105 ± 0.009 |
| 8 | 22.5 | 0.070 ± 0.010 |

TABLE 8

Delamination Soak test for fibers with secondary coating applied thereto

| | Delaminations | | | | | | | |
|---|---|---|---|---|---|---|---|---|
| | Room Temperature soak | | | | 65° C. soak | | | |
| Primary coating | 14 days | 30 days | 60 days | 90 days | 14 days | 30 days | 60 days | 90 days |
| 2 | 0 | 0 | 0 | 0 | 0 | 0 | 0 | 0 |
| 5 | 0 | 0 | 0 | 0 | 0 | 0 | 0 | 0 |
| 7 | 0 | 0 | 0 | 0 | 0 | 0 | 0 | 0 |
| 6 | 0 | 0 | 0 | 0 | 0 | 0 | 0 | 0 |

Figure 9:
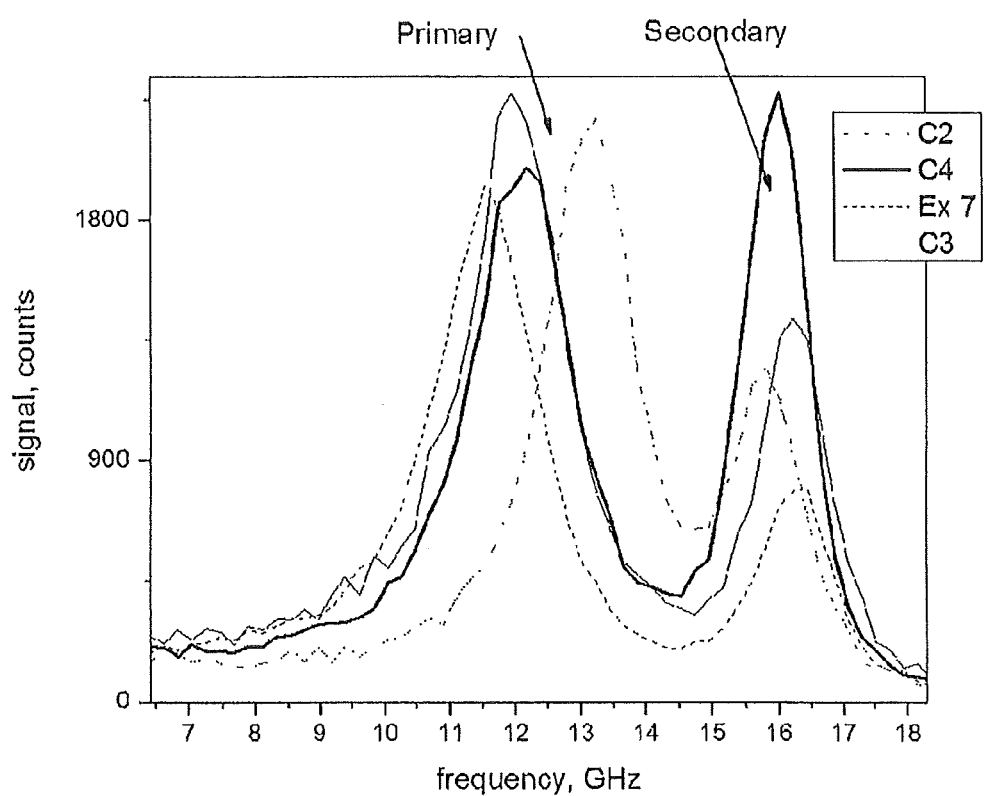
FIG. 9 shows Brillouin scattering spectra for different coating examples described herein.

Brillouin scattering data as measured on films for coatings cured at various lamp speed ratios are set forth below in Table 9. The data was measured using a source wavelength of 532 nm and a scattering angle Theta of 180 degrees. As can be seen in FIG. 9, the coatings disclosed herein are capable of providing a frequency shift, or peak frequency (at a source wavelength of 532 nm and scattering angle of 180 degrees) which is less than 11.65 GHz and greater than 10.8 GHz, more preferably less than 11.62 GHz and greater than 10.7 GHz. At the same time, the coatings described herein are capable of exhibiting a Brillouin peak width (at a source wavelength of 532 nm and scattering angle of 180 degrees), which is less than 2.3 GHz and more than 1.8 GHz, more preferably less than or equal to 2.15 GHz and equal to or more than 1.9 GHz. The coatings described herein also exhibit a speed of sound for their longitudinal component measured by Brillouin scattering method is less than 2090 m/s and more than 1950 m/s, preferably less than 2080 m/s and more than 1950 m/s.

TABLE 9

Brillouin scattering data

| Fiber | Lamp/speed | Peak Frequency | Peak width | RI | Speed of sound, m/s |
|---|---|---|---|---|---|
| C2 | 0.23 | 12.75 | 1.67 | 1.4904 | 2276.2 |
| C3 | 0.31 | 11.67 | 1.85 | 1.4800 | 2097.4 |
| C4 | 0.23 | 11.74 | 1.90 | 1.4862 | 2101.5 |
| Ex 7 | 0.20 | 11.50 | 2.05 | 1.4853 | 2059.9 |
| Ex 7 | 0.23 | 11.60 | 1.90 | 1.4853 | 2077.8 |

Figure 10:
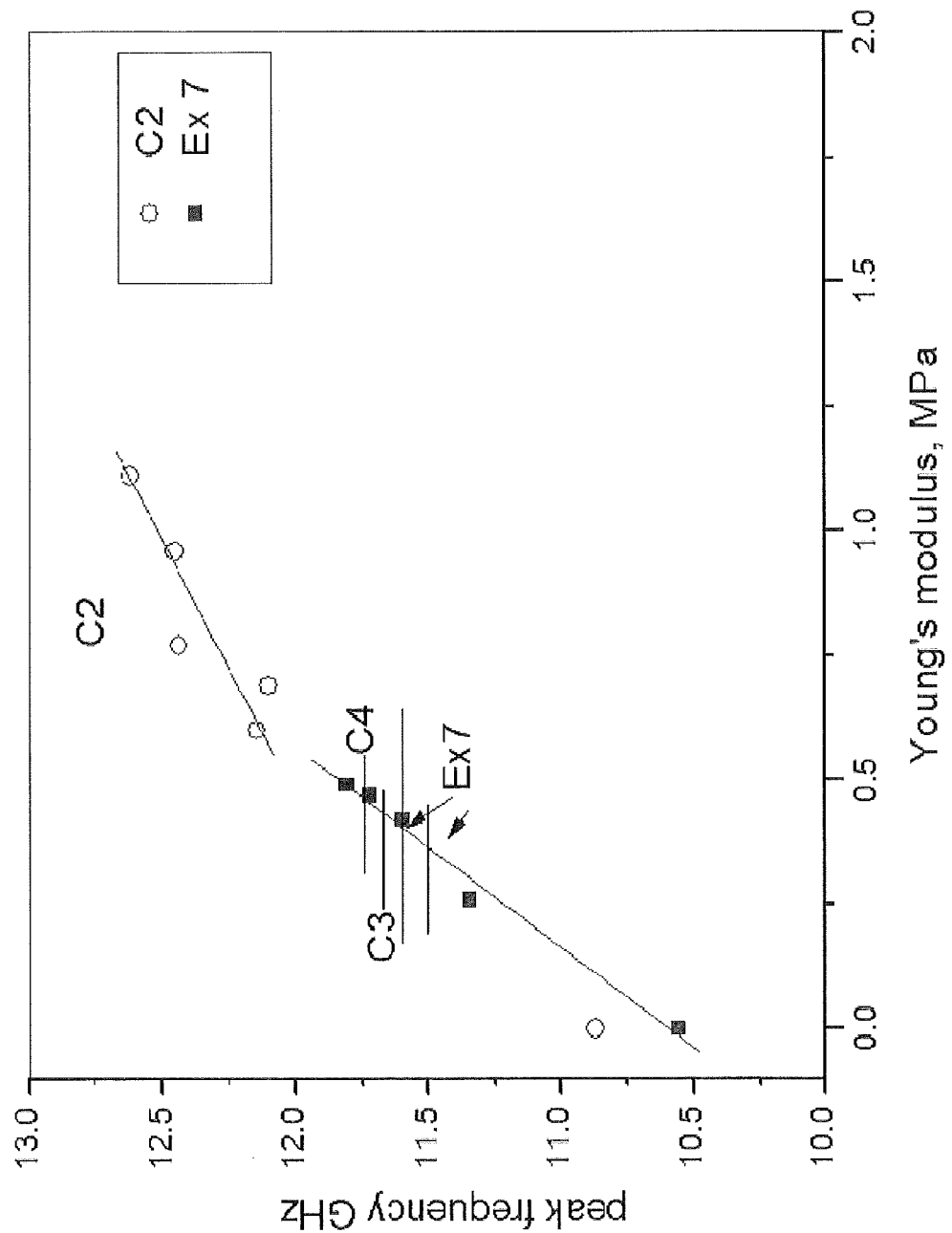
FIG. 10 shows a calibration curve and Brillouin frequency peak at 180 degrees geometry as function of modulus for different primary coatings (films-dots) and fibers (horizontal lines), 532 nm wavelength.
Figure 11:
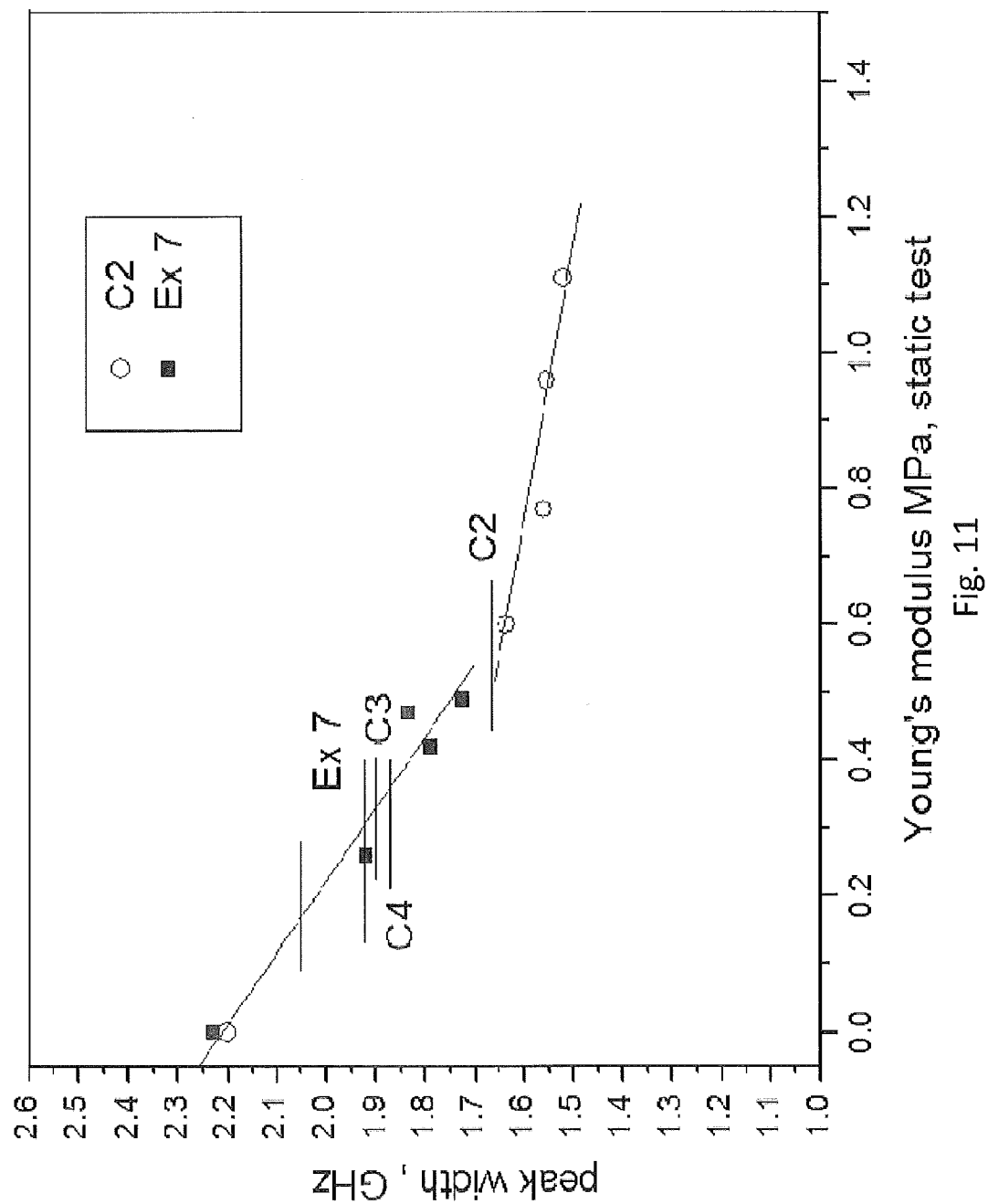
FIG. 11 shows Brillouin peak line width at 180 degrees geometry as function of modulus for different primary coatings (films-dots) and fibers (horizontal lines), 532 nm wavelength
Figure 12:
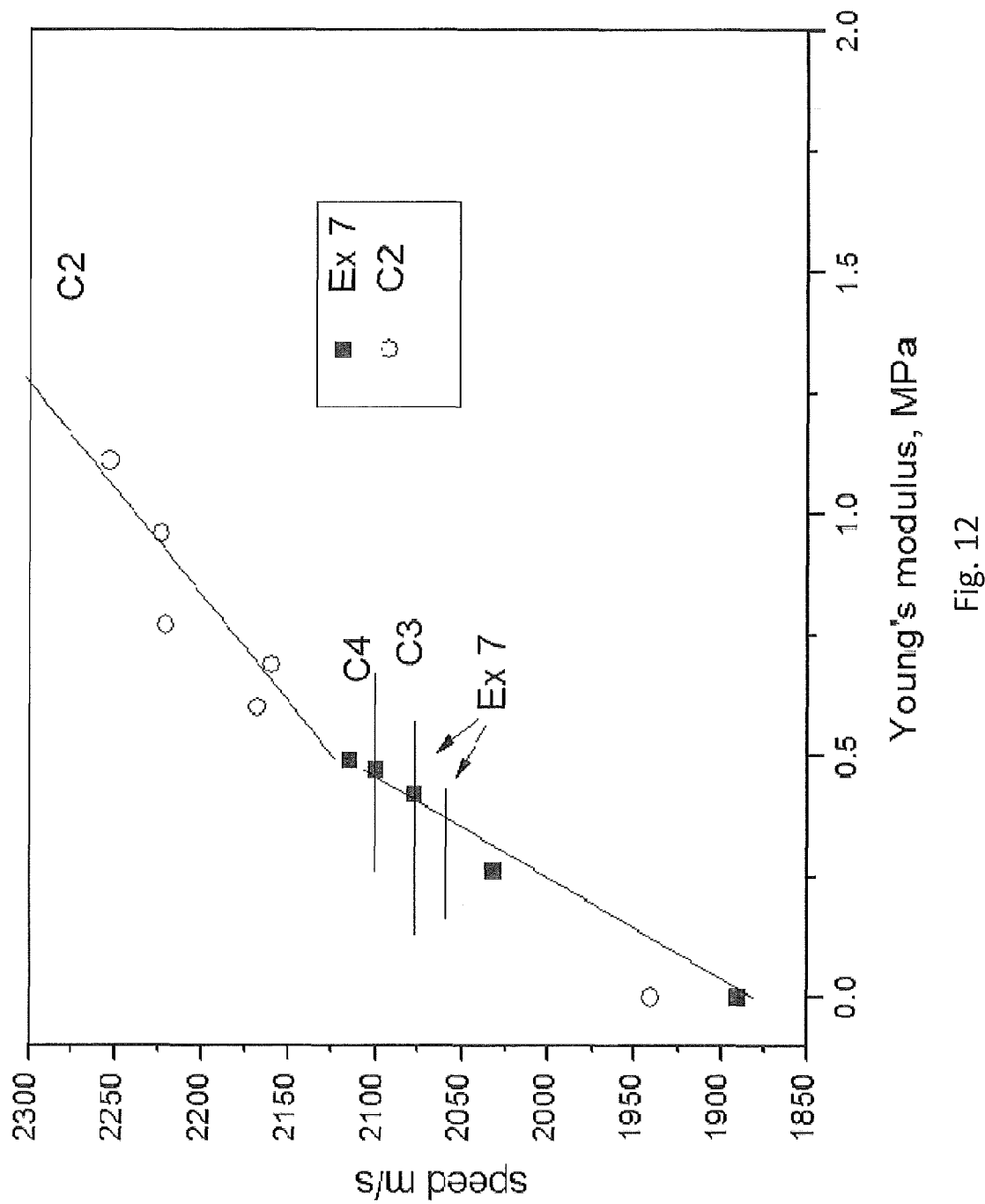
FIG. 12 shows the speed of longitudinal sound at 180 degrees geometry as function of modulus for different primary coatings (films-dots) and fibers (horizontal lines), 532 nm wavelength.

Brillouin scattering is the inelastic scattering of light which occurs due to thermal fluctuations of the lattice of the material. Brillouin scattering is related to the interaction of the input light with the acoustic branch of phonons in the material and has a transverse and a longitudinal mode. Brillouin scattering refers to the displacement of the atoms relative to direction of the light propagation. The acoustic modes can be considered as strain fields that induce density fluctuations. From the frequency shifts obtained from Brillouin scattering measurements and the respective sound velocities through the material being tested can be obtained through the Bragg diffraction equation where density fluctuations produce a volume diffraction grating. The relationship between frequency shift (peak position of the Brillouin scattering line) and material properties can be expressed as:

$$\Delta f = V/\lambda * 2n \sin(\mathrm{Theta}/2) \quad (1),$$

Where $\Delta f$ is the peak position of scattering spectral line, V is speed of sound, $\lambda$ is wavelength of light being transmitted, n is refractive index, and Theta is the angle between the excitation beam and scattered light. For a given geometry and obtained spectrum the speed of sound through the material being tested can be calculated, and elastic constants $C_{11}$ and $C_{44}$ can be obtained. These elastic constants can be used to calculate Young modulus, Shear modulus and bulk modulus. The speed of sound through the primary coating materials disclosed herein is preferably less than 2200 m/s, more preferably less than 2090 m/s. In some embodiments the speed of sound through the materials if greater than 1900 m/s, more preferably greater than 1950 m/s. One advantage of Brillouin spectroscopy is that information on the material may be obtained nondestructively, quickly, and with high spatial resolution, using a small probe spot (e.g. under 50 µm). Therefore the properties may be directly measured on the optical fiber without any damage to it. Brillouin spectroscopy can be used as a tool to obtain properties such speed of sound through the various layers of material at GHz frequency range. For polymers the change of properties from static test to GHz range may be significant. However, as this test shows, the relationship between GHz properties of the material such as speed of sound correlate to static properties (such as Brillouin peak frequency vs. static Young modulus, speed of sound vs. Young modulus), particular via use of an empirically derived calibration curve. FIG. 10 shows a calibration curve for Brillouin peak frequency as function of modulus for different primary coatings (films-dots) and fibers (horizontal lines), taken at 532 nm source wavelength, 180 degrees geometry. FIG. 11 shows a calibration curve for Brillouin peak width as function of modulus for different primary coatings (films-dots) and fibers (horizontal lines), again taken at 532 nm source wavelength, 180 degrees geometry. FIG. 12 shows a calibration curve for the speed of longitudinal sound through the coating material as function of modulus for different primary coatings (films-dots) and fibers (horizontal lines), again taken at 532 nm source wavelength, 180 degrees geometry. For FIGS. 10-12, data points shown as dots show data measured on films, and data points shown as lines are measured on optical fiber. The film measured data points in each of FIGS. 10-12 can be curve fitted to form a calibration line. For example, FIG. 10 illustrates a Brillouin peak frequency calibration curve. The data points can be curve fitted to a calibration line as shown for example in FIG. 10 for both Comparative Example 2 and Example 7. In FIG. 10, the lowest two horizontal optical fiber data lines both correspond to Example 7 coatings shown in Table 9 above which were cured using different lamp speed ratios. Young's modulus for these coatings can be obtained at the point where the calibration line intersects the horizontal fiber data line. For example, for Example 7 sample having a peak frequency of about 11.5 GHz, the Young's modulus will be about 0.35 MPa.

The spectral shape of Brillouin light scattering is fit with Loretz equation $$F(f) = I_1 + (2I_0/\pi) * (\Gamma/(4*(f-f_0)^2 + \Gamma^2)) \quad (2).$$

Where F(f) is spectral shape of the line, $I_1$ is background floor, $I_0$ is amplitude of the line, $f_0$ is peak position, and $\Gamma$ is width of the peak. The methodology of experiment is as follows. To measure backscattering geometry, scattering angle Theta=180 in equation (1) was employed, along with a light having a wavelength 532 nm. The refractive index for primary coating is roughly 1.47-148 at 532 nm, and that of the secondary coating about 1.52 at 532 nm.

Young's modulus properties and Brillouin scattering properties should first be measured on films of the material (either primary or secondary coating) having different degrees of cure, and consequently having different Young's modulus values due to the different degree of cure. The resultant calibration curve may then be used to convert frequency shift (at the particular wavelength and back scattering geometry, i.e wavelength=532 nm, Theta=180 degrees) to a static Young's modulus. Also, the width of line $\Gamma$ also reflects attenuation of the acoustic phonons, or softness of the material, and there is another calibration curve for line width, which was obtained and is shown in FIG. 12. Then measurements were done on actual fiber with both coatings. The spectrum has peaks from both secondary and primary coating, well separated due to difference in mechanical properties as shown in FIG. 9. FIG. 9 illustrates the Brillouin scattering spectra for different coating examples described herein measured using a single frequency laser source from Spectra Physics and a JRS Brillouin spectrometer, the method is well established and used experimental setup is known from existing literature. The fit of the spectrum gives the frequency shift $f_0$ and line width $\Gamma$ for each of the coatings. The obtained values can be placed on calibration curves to obtain static Young modulus value. The coatings described herein exhibit a lower frequency shift or peak frequency (and corresponding value of speed of sound) as well as lower peak width.

Figure 7:
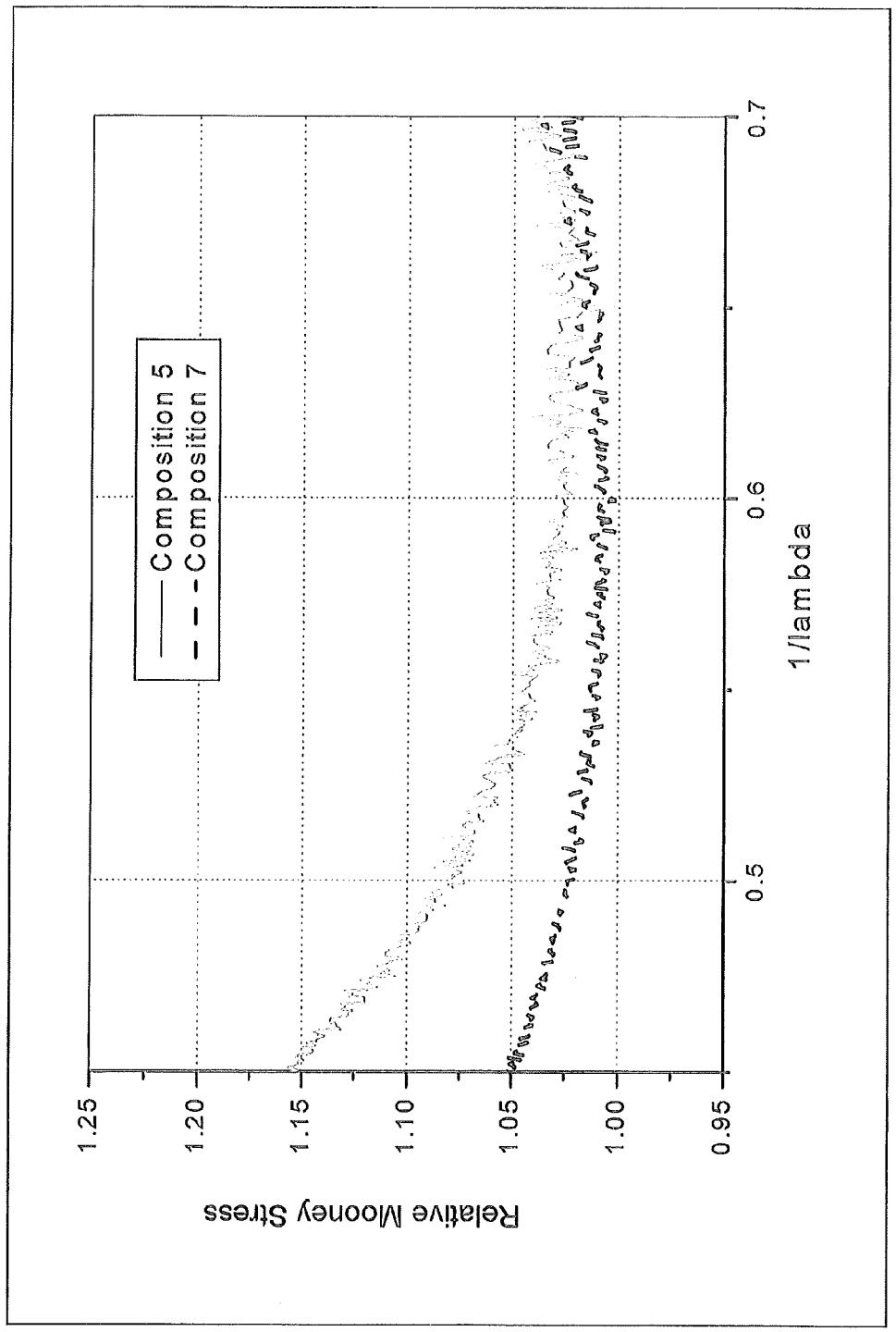
FIG. 7 shows a relative Mooney plot of a one embodiment of the primary coating.

The primary coatings described herein, when measured in an uniaxial tensile test and represented in a relative Mooney plot, are capable of exhibiting a curve which increases on increasing the strain $\lambda$ (or lowering $1/\lambda$) at $1/\lambda$, values of 0.55 and lower, where relative Mooney stress is equal to or less than 1.18 for the strain value of $1/\lambda=0.45$. For example, relative Mooney plots for compositions 5 and 7 described above are illustrated in FIG. 7.

FIG. 8 illustrates the primary coating ovality of a 125 micron diameter optical fiber coated with an approximately 190 micron diameter primary coating having composition 7 described above, which in turn was coated with an approximately 245 micron UV curable acrylate secondary, the primary coating being applied at a lamp to speed ratio of 0.23. More than 25 reels (the majority of the reels having more than 10 km of fiber drawn and stored thereon) of fiber were coated with composition 7 in this manner, and each reel was evaluated for coating ovality, and the results, in terms of percent of the manufacturing distribution vs. outside coating variability in microns, is shown in FIG. 8. As can be seen in the figure, the compositions disclosed herein advantageously are capable of achieving less than 10 microns outside coating variability for more than 80% (more preferably more than 90%, even more preferably 100%) of the manufacturing distribution of optical fiber coated using these coatings, even at relatively low lamp to speed ratios, i.e., lower than about 0.35, more preferably lower than or equal to about 0.30). Still more advantageous is the fact that the coatings described herein can achieve such low coating variability at low lamp speed ratios while still maintaining low Young's modulus (less than about 0.7 MPa).

Although preferred embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A coated optical fiber comprising:
   a glass optical fiber; and
   a primary coating encapsulating the optical fiber, the primary coating having an in-situ modulus of about 0.12 MPa or less at a thickness of about 32.5 μm, a Young's modulus as a cured film of about 0.7 MPa or less, and a $T_g$ below −22° C. and above −40° C., wherein the primary coating is the cured reaction product of a primary curable composition having a gel-time ratio relative to C1 of less than about 2 and more than about 1.1, wherein the primary coating comprises an outer diameter between 170 and 200 microns, the fiber further comprises a secondary coating encapsulating the primary coating, the secondary coating comprising an outer diameter between 240 and 250 microns, and wherein the primary and secondary coatings together exhibit an outer coating variability such that at least 80% of the fiber manufacturing distribution is less than 10 μm when the fiber is manufactured at lamp/speed ratios equal to or less than 0.3.

2. The coated optical fiber of claim 1, wherein the primary coating has an in-situ modulus of about 0.08 MPa or less at a thickness of about 22.5 μm.

3. The coated optical fiber of claim 1, wherein the primary coating exhibits a Mooney stress, when measured in an uniaxial tensile test and represented in a relative Mooney plot, which is equal to or less than 1.18 for the strain value of $1/\lambda=0.45$.

4. The coated optical fiber of claim 1, wherein the primary coating exhibits a Mooney stress, when measured in an uniaxial tensile test and represented in a relative Mooney plot, which is equal to or less than 1.175 for the strain value of $1/\lambda=0.45$.

5. The coated optical fiber of claim 1, wherein the primary coating exhibits a Mooney stress, when measured in an uniaxial tensile test and represented in a relative Mooney plot, which is equal to or less than 1.155 for the strain value of $1/\lambda=0.45$.

6. The coated optical fiber of claim 1, wherein the primary curable composition comprises one or more monofunctional (meth) acrylate monomers in an amount of from about 5 to 95% by weight; an N-vinyl amide monomer in an amount of from about 0.1 to 40% by weight; and one or more difunctional urethane acrylate oligomers which comprise a polyol and an isocyanate, the oligomer present in an amount of from about 5 to 95% by weight, wherein the polyol in the oligomer is a polypropylene glycol and the isocyanate in the oligomer is an aliphatic diisocyanate.

7. The coated optical fiber of claim 6, wherein the isocyanate in the urethane acrylate oligomer is comprised of only one type of isocyanate and the isocyanate is aliphatic.

8. The coated optical fiber of claim 6, further comprising wherein the primary curable composition further comprises an adhesion promoter and a thiol compound, the thiol compound capable of reducing the rate of degradation of the adhesion promoter.

9. The coated optical fiber of claim 1, wherein the primary coating exhibits a Brillouin peak frequency (at a source wavelength of 532 nm and scattering angle of 180 degrees) which is less than 11.65 GHz and greater than 10.8 GHz.

10. The coated optical fiber of claim 9, wherein the primary coating exhibits a Brillouin peak frequency (at a wavelength of 532 nm and scattering angle of 180 degrees) in the Brillouin peak which is less than 11.62 GHz and greater than 10.7 GHz.

11. The coated optical fiber of claim 9, wherein the primary coating exhibits a Brillouin peak width, when measured at 532 nm, and a scattering angle of 180 degrees which is less than 2.3 GHz and more than 1.8 GHz.

12. The coated optical fiber of claim 1, wherein the primary coating exhibits a speed of sound for longitudinal component measured by Brillouin scattering method is less than 2090 m/s and more than 1950 m/s.

* * * * *